United States Patent
Mehendale et al.

(10) Patent No.: US 12,092,565 B2
(45) Date of Patent: Sep. 17, 2024

(54) NON-DESTRUCTIVE INSPECTION AND MANUFACTURING METROLOGY SYSTEMS AND METHODS

(71) Applicant: Onto Innovation Inc., Wilmington, MA (US)

(72) Inventors: Manjusha Mehendale, Morristown, NJ (US); Marco Alves, Newark, NJ (US); Robin Mair, West Chicago, IL (US)

(73) Assignee: Onto Innovation Inc., Wilmington, MA (US)

( * ) Notice: Subject to any disclaimer, the term of this patent is extended or adjusted under 35 U.S.C. 154(b) by 146 days.

(21) Appl. No.: 17/613,318

(22) PCT Filed: May 22, 2020

(86) PCT No.: PCT/US2020/034350
§ 371 (c)(1),
(2) Date: Nov. 22, 2021

(87) PCT Pub. No.: WO2020/237198
PCT Pub. Date: Nov. 26, 2020

(65) Prior Publication Data
US 2022/0228973 A1    Jul. 21, 2022

(51) Int. Cl.
*G01N 21/17*    (2006.01)
(52) U.S. Cl.
CPC ............................. *G01N 21/1702* (2013.01)

(58) Field of Classification Search
CPC ............... G01N 21/1702; G01N 21/55; G01N 21/1717; G01N 21/21; G01N 2021/1725; G01N 2021/1706; G01N 2223/508
See application file for complete search history.

(56) References Cited

U.S. PATENT DOCUMENTS

| 7,050,178 | B2 | 5/2006 | Morath et al. |
| 2001/0028460 | A1 | 10/2001 | Maris et al. |
| 2003/0112451 | A1 | 6/2003 | Mautz |

(Continued)

FOREIGN PATENT DOCUMENTS

| CN | 1555479 A | 12/2004 |
| KR | 10-2009-0048674 A | 5/2009 |

(Continued)

OTHER PUBLICATIONS

International Search Report and Written Opinion dated Sep. 3, 2020, in PCT Application No. PCT/US2020/034350, filed May 22, 2020.

*Primary Examiner* — Suman K Nath
(74) *Attorney, Agent, or Firm* — Paradice & Li LLP

(57) ABSTRACT

Measuring or inspecting samples through non-destructive systems and methods. Multiple light pulses emitted from a light source. The light pulses are split into pump pulses and probe pulses. A first probe pulse reaches the surface of a sample after a first time duration after a first pump pulse reaches the surface. A second pump pulse reaches the surface after a time duration after the first probe pulse. When the second pump pulse reflects off the sample, the second pump pulse may be altered by an acoustic wave generated by the first probe pulse. The reflected second pump pulse may be analyzed to determine a characteristic of the sample.

18 Claims, 20 Drawing Sheets

(56) References Cited

U.S. PATENT DOCUMENTS

2004/0174538 A1* 9/2004 Opsal ................. G01N 21/1717
                                                    356/601
2016/0043008 A1* 2/2016 Murray .................. H01L 22/20
                                                    438/5

FOREIGN PATENT DOCUMENTS

| WO | 2014149213 A1 | 9/2014 |
| WO | 2018015663 A1 | 1/2018 |

\* cited by examiner

1300

```
┌─────────────────────────────────────────────────────────────┐
│  DIRECTING A PUMP LASER PULSE TO THE SURFACE OF A SAMPLE    │
│                          1302                                │
└─────────────────────────────────────────────────────────────┘
                              │
                              ▼
┌─────────────────────────────────────────────────────────────┐
│    DIRECT A PROBE LASER PULSE TO THE SURFACE OF THE SAMPLE  │
│                          1304                                │
└─────────────────────────────────────────────────────────────┘
                              │
                              ▼
┌─────────────────────────────────────────────────────────────┐
│              MODIFYING A LENGTH OF THE DELAY STAGE           │
│                          1306                                │
└─────────────────────────────────────────────────────────────┘
                              │
                              ▼
┌─────────────────────────────────────────────────────────────┐
│  MEASURING DEFLECTION AND/OR INTENSITY OF PUMP BEAM AND/OR  │
│                         PROBE BEAM                           │
│                          1308                                │
└─────────────────────────────────────────────────────────────┘
                              │
                              ▼
┌─────────────────────────────────────────────────────────────┐
│              DETERMINE CHARACTERISTIC OF SAMPLE              │
│                          1310                                │
└─────────────────────────────────────────────────────────────┘
```

FIG. 13

NON-DESTRUCTIVE INSPECTION AND MANUFACTURING METROLOGY SYSTEMS AND METHODS

CROSS REFERENCE TO RELATED APPLICATIONS

This application is a National Stage Entry filed under 35 U.S.C. 371 of PCT/US2020/034350, filed on May 22, 2020, which claims priority to U.S. Provisional Application No. 62/851,929, filed May 23, 2019, and U.S. Provisional Application No. 62/851,905, filed May 23, 2019, all of which are assigned to the assignee hereof and are incorporated by reference in their entireties.

BACKGROUND

Inspection and measurement of materials or products to help ensure the quality of those products is a useful step in manufacturing. The same is true for semiconductor wafers or similar products that include microscopic elements that are not easily measured. Metrology systems have been previously used to make measurements of such wafers. Improvements to those metrology systems, including power consumption, throughput, and performance are advantageous.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure describe systems and methods for measuring, inspecting, and manufacturing semiconductors, metal films, and other samples requiring microscopic measurement techniques. In an aspect, the technology relates to a method of characterizing a sample through opto-acoustic metrology by switching functionality associated with a pump beam and a probe beam, wherein a first pump pulse generates a first acoustic wave in a sample. The method includes generating a second acoustic wave by directing a first probe pulse to the surface of the sample after a first duration of time from the first pump pulse, wherein the first probe pulse reflects off the sample. The method further includes after a second duration of time after the first probe pulse reflects off the surface of the sample, directing a second pump pulse to the surface of the sample, wherein the second pump pulse reflects of the sample and is altered by the second acoustic wave. The method also includes using the reflected second pump pulse to determine a first characteristic of the sample.

In an example, the first duration of time is less than the second duration of time. In another example, the method further includes, based on the first probe pulse, determining a second characteristic of the sample at a first depth, wherein the first characteristic is at a second depth, and the second depth is greater than the first depth. In a further example, the method further includes altering a delay based on an adjustment to a delay stage. In yet another example, the second pump pulse has a first polarization and the first probe pulse has a second polarization. In still another example, the method includes directing a third pump pulse and third probe pulse to a location on the sample that is different from a location where the first pump pulse and the second probe pulse are directed. In another example, the third pump pulse is a secondary pump pulse split from the first pump pulse, and the third probe pulse is a secondary probe pulse split from the first probe pulse.

In another aspect, the technology relates to a method of characterizing a sample through opto-acoustic metrology by switching functionality associated with a pump beam and a probe beam. The method includes directing a first pump pulse towards the surface of the sample, wherein the first pump pulse generates a first acoustic wave in a bulk of the sample, and directing a first probe pulse towards the surface of the sample, wherein the first probe pulse generates a second acoustic wave in the bulk of the sample. The method also includes directing a second pump pulse towards the surface of the sample, wherein the second pump pulse is altered by the second acoustic wave when the second pump pulse reflects from the surface of the sample to create a reflected second pump pulse. The method also includes, based on the detected reflected second pump pulse, determining a first characteristic of the sample at a first depth.

In an example, the method also includes detecting the reflected first probe pulse, and based on the detected reflected first probe pulse, determining a second characteristic of the sample at a second depth. In another example, a duration of time between the first pump pulse reaching the surface and the first probe pulse reaching the surface is less than a duration of time between first probe pulse reaching the surface and the second pump pulse reaching the surface. In a further example, the first depth is greater than the second depth. In another example, the first probe pulse passes through a variable delay stage and the method includes further operations. For instance, the method also includes increasing the length of the variable delay stage; subsequent to increasing the length of the variable delay stage, directing a third pump pulse to the surface, wherein the third pump pulse generates a third acoustic wave in the sample; directing a second probe pulse through the variable delay stage and towards the surface of the sample, wherein: the second probe pulse is altered by the third acoustic wave when the second probe pulse reflects from the surface of the sample to create a reflected second probe pulse; the second probe pulse generates a fourth acoustic wave in the bulk of the sample. The method also may include detecting the reflected second probe pulse; and based on the detected reflected second probe pulse, determining a third characteristic of the sample at a third depth, wherein the third depth is greater than the second depth.

In another example, the method further includes directing a fourth pump pulse towards the surface of the sample, wherein the fourth pump pulse is altered by the fourth acoustic wave when the fourth pump pulse reflects from the surface of the sample to create a reflected fourth pump pulse; and based on the detected reflected fourth pump pulse, determining a fourth characteristic of the sample at a fourth depth, the fourth depth being less than the first depth. In a further example, the first probe pulse has a first polarization and the second pump pulse has a second polarization. In yet another example, the first pump pulse and the second pump pulse are part of a pump beam.

In another aspect, the technology relates to a system for characterizing a sample through opto-acoustic metrology by switching functionality associated with a pump beam and a probe beam, wherein a first pump pulse generates a first acoustic wave in a sample. The system includes means for generating a second acoustic wave by directing a first probe pulse to the surface of the sample after a first duration of time from the first pump pulse, wherein the first probe pulse reflects off the sample; means for directing a second pump pulse to the surface of the sample after a second duration of time after the first probe pulse reflects off the surface of the sample, wherein the second pump pulse reflects of the sample and is altered by the second acoustic wave; and means for using the reflected second pump pulse to determine a first characteristic of the sample.

In an example, the first duration of time is less than the second duration of time. In another example, the second pump pulse has a first polarization and the first probe pulse has a second polarization. In a further example, the system also includes means for using the reflected first probe pulse to generate a second characteristic of the sample. In yet another example, the first characteristic corresponds to a first depth and the second characteristic corresponds to a second depth, the first depth being greater than the second depth.

In another aspect, the technology relates to a method that includes emitting a light pulse from a light source, splitting the light pulse into a pump pulse and a probe pulse, splitting the probe pulse into a primary probe pulse and a secondary probe pulse, and directing the pump pulse to a measurement point on a sample. The method also includes directing the primary probe pulse and the secondary probe pulse to the measurement point on the sample such that: the primary probe pulse reaches the measurement point subsequent to at least a portion of the pump pulse reaching the measurement point; and the secondary probe pulse reaches the measurement point subsequent to the primary probe pulse reaching the measurement point. In an example, the method also includes detecting the primary probe pulse after it has reflected from the measurement point; and detecting the secondary probe pulse after it has reflected from the measurement point. In another example, the method further includes analyzing the detected primary probe pulse and the secondary probe pulse; based on the analysis of the detected primary probe pulse and the secondary probe pulse, approving the sample for additional manufacturing steps; and based on the approval of the sample, performing one or more of the additional manufacturing steps. In still another example, the method further includes splitting the pump pulse into a primary pump pulse and a secondary pump pulse. In yet another example, directing the pump pulse to the measurement point includes directing in the primary pump pulse and the secondary pump pulse to the measurement point. In still yet another example, the primary pump pulse reaches the measurement point prior to the primary probe pulse and the secondary pump pulse reaches the measurement point prior to the secondary probe pulse.

In another example, the method further includes modulating the pump pulse prior to splitting the pump pulse. In still another example, the primary pump pulse has a polarization that is different from a polarization of the secondary pump pulse. In yet another example, the method further includes modulating the probe pulse prior to splitting the probe pulse. In still yet another example, the primary probe pulse is directed towards the measurement point at a first azimuthal angle and the secondary probe pulse is directed towards the measurement point at a second azimuthal angle. In another example, the primary probe pulse reaches the measurement point less than 9 nanoseconds after the pump pulse reaches the measurement point; and the secondary probe pulse reaches the measurement point at least 9 nanoseconds after the pump pulse reaches the measurement point.

In another aspect, the technology relates to a system that includes a light source configured to emit a pulse of light; a first beam splitter positioned to split the pulse of light into a pump pulse and a probe pulse; and a second beam splitter positioned, in a beam path of the probe pulse, to split the probe pulse into a primary probe pulse and a secondary probe pulse. The system also includes at least one mirror positioned, in a beam path of the secondary probe pulse, to cause the beam path length of the secondary probe pulse to be longer than the beam path length of the primary probe pulse; and one or more focusing optics positioned to direct the pump pulse, the primary probe pulse, and the secondary probe pulse to an measurement point on a sample. In an example, the system further includes an optical modulator positioned in the beam path of the probe pulse and between the first beam splitter and the second beam splitter, wherein the probe beam optical modulator is configured to modulate the probe pulse. In another example, the system further includes one or more detectors, wherein the one or more detectors are positioned to receive the primary probe pulse and the secondary probe pulse after they have reflected off the sample. In still another example, the system also includes a pump beam optical modulator positioned in the beam path of the pump pulse, wherein the pump beam optical modulator is configured to modulate the pump pulse. In yet another example, the system further includes a third beam splitter positioned, in the beam path of the pump pulse, to split the pump pulse into a primary pump pulse and a secondary pump pulse. In still yet another example, the system further includes a half-wave plate positioned, between the third beam splitter and the focusing optics, in at least one of the beam path of the primary pump pulse or the secondary pump pulse.

In another example, the system further includes an adjustable delay stage, positioned between the first beam splitter and the second beam splitter, configured to increase the beam path length of the probe pulse, wherein the adjustable delay stage includes at least three retroreflectors. In yet another example, a difference between a beam path length of the pump pulse and a beam path length of the secondary probe pulse is configured to result in the secondary probe pulse reaching the measurement point at least 9 nanoseconds after the pump pulse. In still another example, a difference between the beam path length of the pump pulse and a beam path length of the primary probe pulse is configured to result in the primary probe pulse reaching the measurement point less than 9 nanoseconds after the pump pulse.

In another aspect, the technology relates to a method for manufacturing. The method includes emitting a light pulse from a light source; splitting the light pulse into a pump pulse and a probe pulse; splitting the pump pulse into a primary pump pulse and a secondary pump pulse; and splitting the probe pulse into a primary probe pulse and a secondary probe pulse. The method also includes directing the primary pump pulse and the primary probe pulse to a first measurement point on a sample; and directing the secondary pump pulse and the secondary probe pulse to a second measurement point on the sample. In an example, the method further includes detecting the primary probe pulse after it has reflected from the first measurement point; and detecting the secondary probe pulse after it has reflected from the second measurement point. In another example, the method further includes analyzing the detected primary probe pulse and the secondary probe pulse; based on the analysis of the detected primary probe pulse and the secondary probe pulse, approving the sample for additional manufacturing steps; and based on the approval of the sample, performing one or more of the additional manufacturing steps. In still another example, the method further includes analyzing a first signal, the first signal corresponding to the detected primary probe pulse; based on the analysis of the first signal, determining a thickness for a layer of the sample at the first measurement point; analyzing a second signal, the second signal corresponding to the detected secondary probe pulse; and based on the analysis of the second signal, determining a thickness for the layer of the sample at the second measurement point. In yet another example, the primary pump pulse has a polarization that is different from a polarization of the secondary pump pulse. In still yet another example, the primary probe pulse has a polarization that is different from a polarization of the secondary probe pulse.

In another example, the primary probe pulse has a polarization that is the same as the secondary pump pulse. In still another example, the method further includes prior to splitting the pump pulse, modulating the pump pulse with a first optical modulator; and prior to splitting the probe pulse, modulating the probe pulse with a second optical modulator, wherein the pump pulse is modulated at a different frequency than the probe pulse. In yet another example, directing the primary pump pulse and the primary probe pulse to the first measurement point includes directing at least one of the primary pump pulse or the primary probe pulse through one or more optical fibers. In still yet another example, directing the secondary pump pulse and the secondary probe pulse to the second measurement point includes directing at least one of the secondary pump pulse or the secondary probe pulse through one or more optical fibers. In another example, the light source is a laser.

In another aspect, the technology relates to a system that includes a light source configured to emit a pulse of light; a first beam splitter positioned to split the pulse of light into a pump pulse and a probe pulse; a second beam splitter, in a beam path of the probe pulse, positioned to split the probe pulse into a primary probe pulse and a secondary probe pulse; and a third beam splitter, in a beam path of the pump pulse, positioned to split the pump pulse into a primary pump pulse and a secondary pump pulse. The system also includes one or more focusing optics positioned to: direct the primary pump pulse and the primary probe pulse to a first measurement point on a sample; and direct the secondary pump pulse and the secondary probe pulse to a second measurement point on the sample. In an example, the system further includes one or more detectors, wherein the one or more detectors are positioned to receive the primary probe pulse and the secondary probe pulse after they have reflected off the sample. In another example, the system further includes at least one processor; and memory operatively connected to the at least one processor, the memory storing instructions, that when executed by the at least one processor cause the system to perform a set of operations. The set of operations includes analyze a first signal from the one or more detectors, the first signal corresponding to the reflected primary probe pulse; based on the analysis of the first signal, determine a thickness for a layer of the sample at the first measurement point; analyze a second signal from the one or more detectors, the second signal corresponding to the reflected secondary probe pulse; and based on the analysis of the second signal, determine a thickness for the layer of the sample the second measurement point.

In another example, the primary pump pulse has a polarization that is different from a polarization of the secondary pump pulse. In still another example, the primary probe pulse has a polarization that is different from a polarization of the secondary probe pulse. In yet another example, the primary probe pulse has a polarization that is the same as the secondary pump pulse. In still yet another example, the system further includes a first optical fiber positioned to receive the secondary pump pulse, the first optical fiber configured to direct the secondary pump pulse to the second measurement point; and a second optical fiber positioned to receive the secondary probe pulse, the second optical fiber configured to direct the secondary probe pulse to the second measurement point. In another example, the system further includes a first optical modulator positioned between the first beam splitter and the third beam splitter, the first optical modulator configured to modulate the pump pulse. In yet another example, the system further includes a second optical modulator positioned between the first beam splitter and the second beam splitter, the second optical modulator configured to modulate the probe pulse at a different frequency than the pump pulse.

In another aspect, the technology relates to a method that includes directing a pump pulse to an measurement point of a sample, wherein the measurement point of the sample includes a pillar protruding from a surface of the sample, the pillar having a first layer of a first material and a second layer of a second material; directing a probe pulse to the measurement point of the sample; detecting the probe pulse after the probe pulse has reflected from the measurement point on the sample; analyzing characteristics of the detected probe pulse to determine an internal depth of the first layer; measuring an external height of the pillar at the measurement point; and determining a difference between the measured height of the pillar and the internal depth of the first layer to determine a thickness of the second layer above the surface of the sample. In an example, measuring the external height of the pillar is performed using an optical interferometry system. In another example, measuring the external height of the pillar is performed using a mechanical measurement system. In yet another example, measuring the external height of the pillar is performed using a sonar measurement system. In still another example, measuring the external height of the pillar includes: emitting a first electromagnetic wave pulse towards the surface of the sample; detecting the first electromagnetic wave pulse after it has reflected from the surface of the sample; based on the time between emitting the first electromagnetic wave and the detecting the first electromagnetic wave, determining a first distance; emitting a second electromagnetic wave pulse towards the top of the pillar; detecting the second electromagnetic wave pulse after it has reflected from the top of the pillar; based on the time between emitting the second electromagnetic wave and the detecting the second electromagnetic wave, determining a second distance to the top of the pillar; and determining the difference between the first distance and the second distance to determine the external height of the pillar above the surface.

In another example, measuring the external height of the pillar includes: emitting a first pressure wave towards the surface of the sample; detecting the first pressure wave after it has reflected from the surface of the sample; based on the time between emitting the first pressure wave and the detecting the first pressure wave, determining a first distance; emitting a second pressure wave towards the top of the pillar; detecting the second pressure wave after it has reflected from the top of the pillar; based on the time between emitting the second pressure wave and the detecting the second pressure wave, determining a second distance to the top of the pillar; and determining the difference between the first distance and the second distance to determine the external height of the pillar above the surface. In yet another example, the first material is tin-silver (SnAg) and the second material is copper (Cu).

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

FIG. 13 illustrates an example method for controlling an opto-acoustic metrology system.

DETAILED DESCRIPTION

Metrology systems may be used to measure microscopic features of samples, such as semiconductor wafers. The metrology systems generally utilize a laser to generate a beam of light composed of a series of light pulses. As an example, a pump pulse of light and probe pulse of light may be generated. The pump pulse is directed to a measurement point on the sample, and when the pump pulse reaches the sample, an acoustic wave is generated that travels internally through the bulk of the sample. When the acoustic wave encounters a layer change or an edge of the sample, it is reflected back towards the surface of the sample. Subsequent to the pump pulse reaching the sample, the probe pulse is directed to the measurement point on the sample. When the probe pulse reaches the measurement point, the probe pulse is affected by the acoustic wave if that acoustic wave has reached the surface after reflecting from a layer change or edge of the sample. Accordingly, analyzing the probe pulse after it has reflected from the measurement point provides information about the sample, such as a thickness of the sample. For instance, the time delay between the pump pulse and the probe pulse that is affected by the acoustic wave indicates the duration of time the acoustic wave traveled through the bulk of the sample. With the speed of sound known for the material of the sample or a particular layer in the sample the thickness of the sample, or layer, can be determined from the time the acoustic traveled.

In metrology systems, however, the delay between the pump pulse and the probe pulse is difficult to increase. For example, in some metrology systems, a single laser light pulse is split into a pump pulse and probe pulse. Delaying the probe pulse from the pump pulse in such systems provides challenges, and the maximum thickness that can be measured is limited by the maximum delay between the pump pulse and the probe pulse. The present technology provides for improvements that allow for increased delay between the pump pulse and the probe pulse, even where both the pump pulse and the probe pulse are generated from the same laser light pulse. Thus, increased thicknesses can be measured.

In addition, the present technology also provides for better performance of the metrology systems. The improved performance allows for reduced inspection or measurement times and increased accuracy of measurements. For example, the present technology is capable of harnessing or scavenging light that was previously rejected or wasted in metrology systems. By harnessing the previously rejected light, additional measurements may be completed with a single pulse of laser light. For instance, in some examples, multiple measurements of a single measurement point may be achieved from a single pulse of laser light. Accordingly, additional measurements may be completed more rapidly as multiple measurements may be performed with every pulse of light that is emitted from the laser.

Figure 1A:
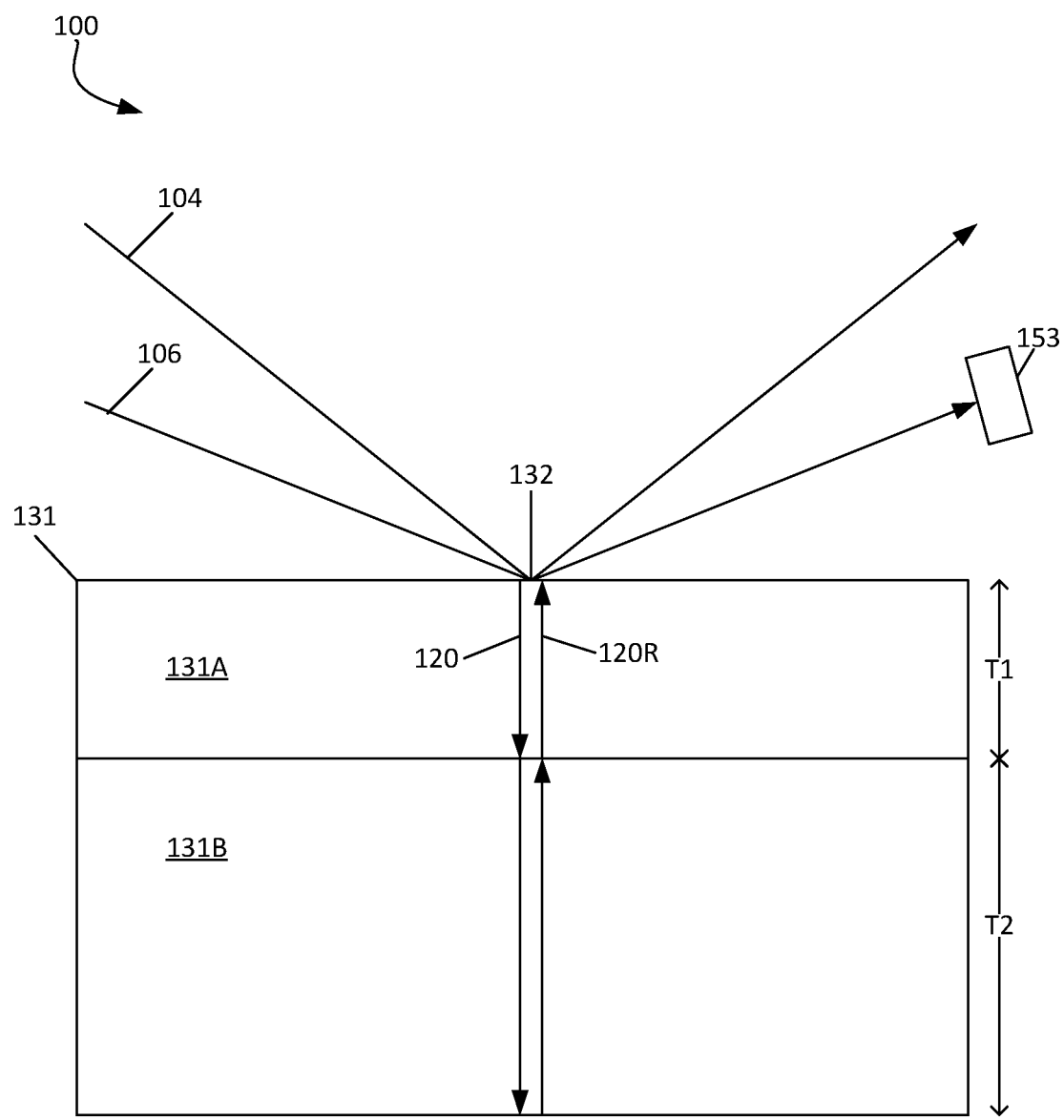
FIG. 1A depicts a portion of an example metrology system for inspecting a sample.

FIG. 1A depicts a portion of an example metrology system 100 for measuring or inspecting a sample 131 having a first layer 131A and a second layer 131B. In system 100, a pump pulse travels along the pump beam path 104 and is directed to the measurement point 132. When the pump pulse reaches the measurement point 132, an acoustic wave 120 is generated that travels internally into the bulk of the sample 131. The acoustic wave 120 travels through the sample 131 until reaching a boundary between the first layer 131A and the second layer 131B. At the boundary, a portion of the acoustic wave 120 is reflected back towards the surface of the sample 131, as depicted by reflected acoustic wave 120R. A portion of the acoustic wave 120 also continues through the boundary into the second layer 131B. When the acoustic wave 120 reaches the edge of the sample 131, it is reflected back towards the surface of the sample 131. Subsequent to the pump pulse reaching the measurement point 132, a probe pulse travels along the probe beam path 106 to the measurement point 132. The probe pulse reflects from the measurement point 132 and continues to follow the probe beam path 106 until it reaches a detector 153. If the reflected acoustic wave 120R has reached the surface of the sample 131 at about the same time that the probe pulse reaches the measurement point 132, the probe pulse is affected by the reflected acoustic wave 120R. When the reflected probe pulse is detected, the effects of the reflected acoustic wave 120R on the probe pulse can be identified in the signal generated by the detector 153.

Based on the time between the pump pulse reaching the measurement point 132 and the probe pulse reaching the measurement point 132, the thickness (T1) of the first layer 131A and the thickness (T2) of the second layer 131B may be determined based on the speed of sound of the acoustic wave 120. As an example, the first layer 131A may be made from aluminum, and the speed of sound of aluminum is about 64.1 Angstroms per picosecond (Å/psec). In such an example, where the effects of the acoustic wave 120 are seen in a probe pulse that reaches the measurement point 132 about 9,300 picoseconds after the pump pulse, a determination can be made that the first layer 131A has a thickness (T1) of about 29.8 micrometers. Similar measurements and determinations may be made to determine the thickness (T2) of the second layer 131B and/or the total thickness (T1+T2) of the sample 131.

Because the thickness determination is based on the delay between the pump pulse and the probe pulse, increasing that delay allows for measurements of sample having increased thicknesses. Where the pump pulse and the probe pulse are generated from the same pulse of laser light, creating or extending the delay is a challenge. The present system 100 provides improvements that allow for increasing the delay between the pump pulse and the probe pulse by incorporating an extended delay stage in the probe beam path.

Figure 1B:
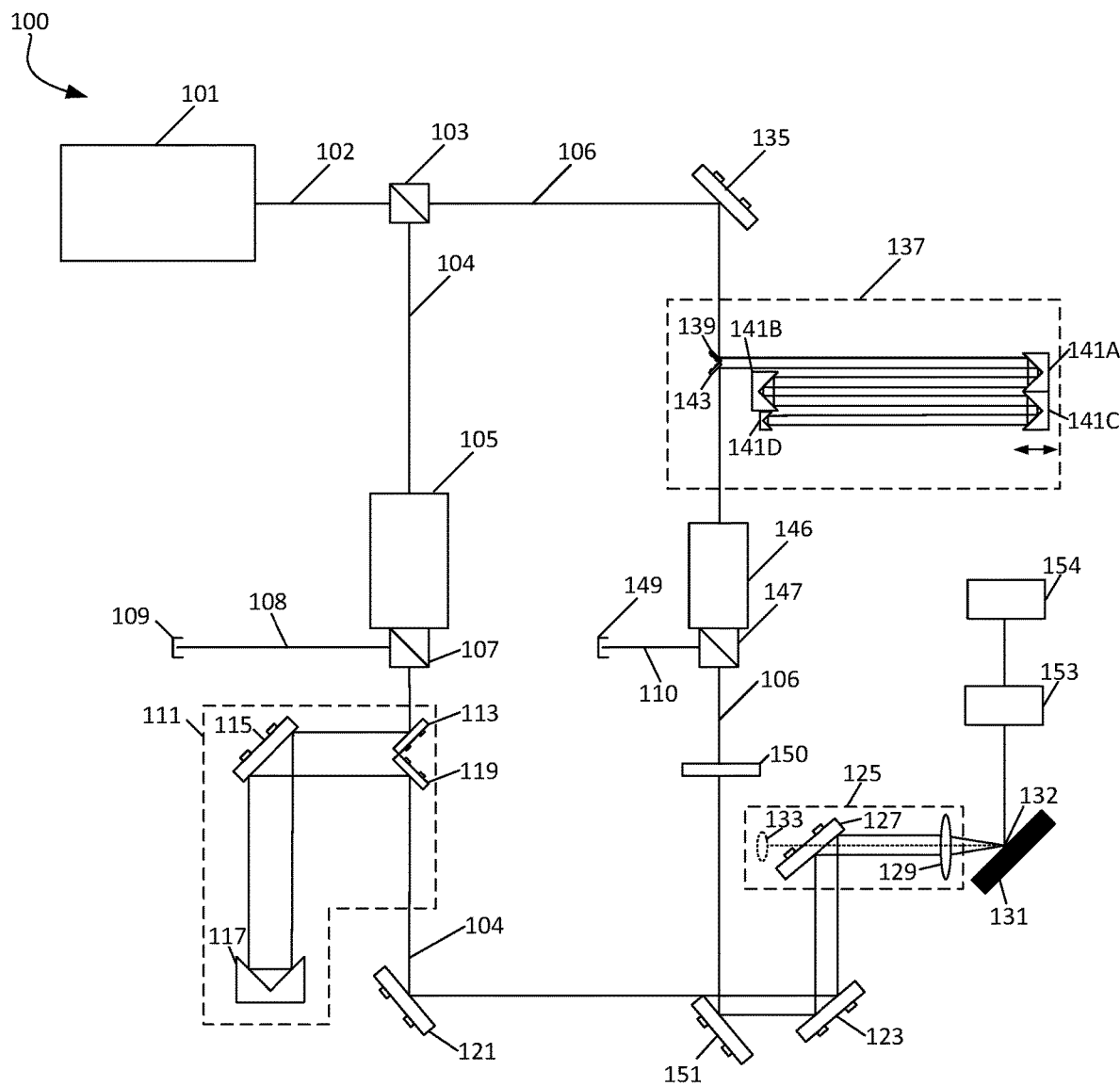
FIG. 1B depicts a schematic view of the example metrology system depicted in FIG. 1A.

Additional details regarding the metrology system 100 are depicted in FIG. 1B, which depicts a schematic view of the metrology system 100. In system 100, a light source 101, such as a laser, emits a light pulse that follows beam path 102. A first beam splitter 103 is located in the beam path 102. The first beam splitter 103 splits the light pulse emitted from the light source 101 into a pump pulse that follows pump beam path 104 and a probe pulse that follows probe beam path 106. As used herein, a beam splitter is an optical devices that can split an incident light beam or pulse into two or more beams. In examples, the beam splitters may be plate or cube beam splitters, such as a cube polarizer.

The pump pulse follows the pump beam path 104 and reaches a pump beam optical modulator 105. The pump beam optical modulator 105 modulates the pump pulse. In some examples, the pump beam optical modulator 105 modulates the pump pulse. The frequency at which the pump pulse is modulated may be in the range of several megahertz (MHz), such as about 5 or 5.5 MHz. Other frequencies may also be utilized. The modulated pump pulse then continues to follow the pump beam path 104 and reaches a pump beam splitter 107 located after the pump beam optical modulator 105 in the pump beam path 104. The pump beam splitter 107 splits the modulated pump pulse. A portion of the pump pulse continues along the pump beam path 104 and the remaining portion of the pump pulse that is routed along waste or rejected pump light path 108 into a waste or rejected pump beam dump 109, also referred to as a photon motel. As such, the extra light from the pump pulse is wasted. A beam dump as used herein is an optical element used to absorb light, such as the rejected pump pulse.

The portion of the pump pulse that is not rejected continues along the pump beam path 104 into a pump beam delay stage 111. The pump beam delay stage 111 extends the length of the pump beam path 104 and thus increases the time for the pump pulse to reach the measurement point. In some examples, however, the pump beam delay stage 111 may be omitted. The pump beam delay stage 111 includes a first pump beam delay mirror 113, second pump beam delay mirror 115, pump beam delay retroreflector 117, and a third pump beam delay mirror 119. The first pump beam delay mirror 113 directs the pump pulse to the second pump beam delay mirror 115. The second pump beam delay mirror 115 directs the pump pulse to the pump beam delay retroreflector 117. The pump beam delay retroreflector 117 directs the pump pulse back to the second pump beam delay mirror 115, which directs the pump pulse to the third pump beam delay mirror 119. The third pump beam delay mirror 119 directs the pump pulse to a pump beam directional mirror 121. The pump beam directional mirror 121 directs the pump pulse to a directional mirror 123, which directs the pump pulse to a plurality of focusing optics 125. Some elements of the pump beam delay stage 111 may also be adjustable. For instance, position of the pump beam delay retroreflector 117 may be adjusted closer to, or further from, the second pump beam delay mirror 115. As an example, the pump beam delay retroreflector 117 may be on a stage controlled by a motor, a servo, and/or a piezoelectric controller, among other possible controllers. Moving the pump beam delay retroreflector 117 closer to the second pump beam delay mirror 115 shortens the total path length for the pump beam pulse, and thus increases the delay between the pump beam pulse and the probe beam pulse(s). In contrast, moving the pump beam delay retroreflector 117 further from the second pump beam delay mirror 115 lengthens the total path length for the pump beam pulse, and thus shortens the delay between the pump beam pulse and the probe beam pulse(s).

The focusing optics 125 include a focusing mirror 127, a focusing lens 129, and a height detection system 133. The focusing optics 125 are positioned to direct and focus the probe pulse onto the measurement point 132 of the sample 131. In the example depicted in FIG. 1B, the pump pulse continues from the directional mirror 123 along the pump beam path 104 until it reaches the focusing mirror 127. The focusing mirror 127 directs the pump pulse through a focusing lens 129, which focuses the pump pulse to the measurement point 132.

The pump pulse reaches the measurement point 132, which generates the acoustic wave 120 that travels through the bulk of the sample 131. The pump pulse is also reflected from the measurement point 132 and the reflected pump pulse may be captured by the detector 153 or a beam dump (not depicted). In some examples, because the reflected pump pulse is not generally analyzed, the reflected pump beam may be filtered out by the detector 153 or prior to reaching the detector 153.

Returning back to the first beam splitter 103 discussed above, the first beam splitter 103 also splits the light pulse from the light source 101 into a probe pulse that follows probe beam path 106. The probe pulse travels along the probe beam path 106 and is directed by a probe beam directional mirror 135. The probe beam directional mirror 135 directs the probe pulse to an extended probe beam delay stage 137.

The extended probe beam delay stage 137 is configured to extend the length of the probe beam path 106 and thus create delay between the time the pump pulse reaches the measurement point 132 and the time the probe pulse reaches the measurement point 132. The extended probe beam delay stage 137 creates an abnormally long extension of the probe beam path 106, which provides the metrology system 100 the ability to measure greater depths or thicknesses than were previously possible. The extended probe beam delay stage 137 includes a first probe beam delay mirror 139 that directs the probe pulse to a first probe beam delay retroreflector 141A. The first probe beam delay retroreflector 141A directs the probe pulse to a second probe beam delay retroreflector 141B, which directs the probe pulse to a third probe beam delay retroreflector 141C, which the directs the probe pulse to a fourth probe beam delay retroreflector 141D. From the fourth probe beam delay retroreflector 141D, the probe pulse returns back through the plurality of probe beam delay retroreflectors 141. For instance, the fourth probe beam delay retroreflector 141D directs the probe pulse back to the third probe beam delay retroreflector 141C, which reflects the probe pulse to the second probe beam delay retroreflector 141B, which reflects the probe pulse to the first probe beam delay retroreflector 141A. The first probe beam delay retroreflector 141A then reflects the probe pulse to a second probe beam delay mirror 143.

The extended probe beam delay stage 137 may also be adjustable. For example, the first probe beam delay retroreflector 141A and the second probe beam delay retroreflector 141B may be on a stage controlled by a motor, a servo, and/or a piezoelectric controller, among other possible controllers. Thus, the first probe beam delay retroreflector 141A and the third probe beam delay retroreflector 141C may be moved closer to the second probe beam delay retroreflector 141B and the fourth probe beam delay retroreflector 141D. Moving the respective probe beam delay retroreflectors 141 closer or further from one another reduces or increases the overall path length for the probe pulse, which reduces or increases the delay between the pump pulse and the probe pulse. Accordingly, if a particular delay time is desired, that delay time can be achieved by adjusting the relative positions of the probe beam delay retroreflectors 141. In an example, the delay may be configured from zero picoseconds to 9,300 picoseconds.

In the example depicted, the extended probe beam delay stage 137 includes four probe beam delay retroreflectors 141 to create an eight-pass delay stage. In other examples, the extended probe beam delay stage 137 may include more than four probe beam delay retroreflectors 141. For instance, the extended probe beam delay stage 137 may include eight probe beam delay retroreflectors 141 to create a sixteen-pass delay stage.

Once the probe pulse reaches the second probe beam delay mirror 143 from the extended probe beam delay stage 137, the second probe beam delay mirror 143 directs the probe pulse along the probe beam path 106 to an optional probe beam optical modulator 146. The probe beam optical modulator 146 modulates the probe pulse at a different frequency than the pump beam light has been modulated. For example, the probe beam optical modulator 146 may modulate the probe pulse at a frequency that is an order of magnitude different than the modulation frequency for the pump beam. In some examples, the probe beam optical modulator 146 may be omitted. The modulated probe pulse then reaches probe beam splitter 147. The probe beam splitter 147 splits the probe pulse, which allows a portion of the probe pulse to continue along the probe beam path 106 and another portion of the probe pulse is directed along a waste or rejected probe light path 110 into a waste or rejected probe beam dump 149. Accordingly, the portion of the probe pulse that is directed along the waste or rejected probe light path 110 is effectively wasted.

The portion of the probe light pulse that continues along the probe beam path 106 and passes through a half-wave plate 150. The half-wave plate 150 alters the polarization of the primary probe pulse, such as by rotating the polarization of the primary probe pulse by 90 degrees. From the half-wave plate 150, the probe pulse continues along the probe beam path 106 and reaches a probe beam directional mirror 151. In some examples of the metrology system 100, the half-wave plate 150 and the probe beam splitter 147 may be omitted. In such examples, the probe pulse may travel directly from the extended probe beam delay stage 137 to the probe beam directional mirror 151.

The probe beam directional mirror 151 directs the probe pulse to the directional mirror 123, which directs the probe pulse to the focusing optics 125. The focusing optics 125 focus the probe pulse onto the measurement point 132 of the sample 131. For instance, the focusing mirror 127 directs the probe pulse through the focusing lens 129, which focuses the probe pulse onto the measurement point 132. The probe pulse then reflects off the surface of the sample 131 to the detector 153. The detector 153 detects the probe pulse after it has reflected from the measurement point 132. The detector 153 may convert the reflected probe pulse into an electrical signal, which may be in a digital or analog format. The detector 153 passes the signal to a signal processing and analysis system 154 where the signal is analyzed. The signal processing and analysis system 154 is able to determine thicknesses of the sample 131 based on the signal(s) received from the detector 153. Additional details regarding a suitable operating environment for the signal processing and analysis system 154 is discussed in further detail below with reference to FIG. 4.

By utilizing the example metrology system 100 depicted in FIGS. 1A & 1B, increased thickness measurements may be achieved as the delay between the pump pulse and the probe pulse is increased. In the example depicts in FIG. 1B, the example metrology system 100 is able to achieve a delay between the pump pulse and the probe beam of pulse of at least 9,300 picoseconds. With such a delay, thicknesses of around 30 micrometers can be measured. Table 1 below identifies thickness measurement capabilities for the example metrology system 100 based on different types of materials.

TABLE 1

| Material Type | Speed of Sound in Material (Å/psec) | Thickness Measurement for 9300 psec Delay (μm) |
| --- | --- | --- |
| Aluminum (Al) | 64.1 | 29.8 |
| Copper (Cu) | 50 | 23.3 |
| Gold (Au) | 32.8 | 15.3 |
| Nickel (Ni) | 60.4 | 28.1 |
| Tin-Silver (SnAg) | 34.6 | 16.1 |
| Cobalt (Co) | 58.6 | 27.2 |

More specifically, Table 1 includes a listing in column 1 of material types that may form layers in a sample. The second column includes the corresponding speed of sound for the material listed in the first column. The third column then provides a potential thickness measurement for a delay of 9,300 psec between the pump pulse and the probe pulse reaching the measurement point 132.

Figure 2A:
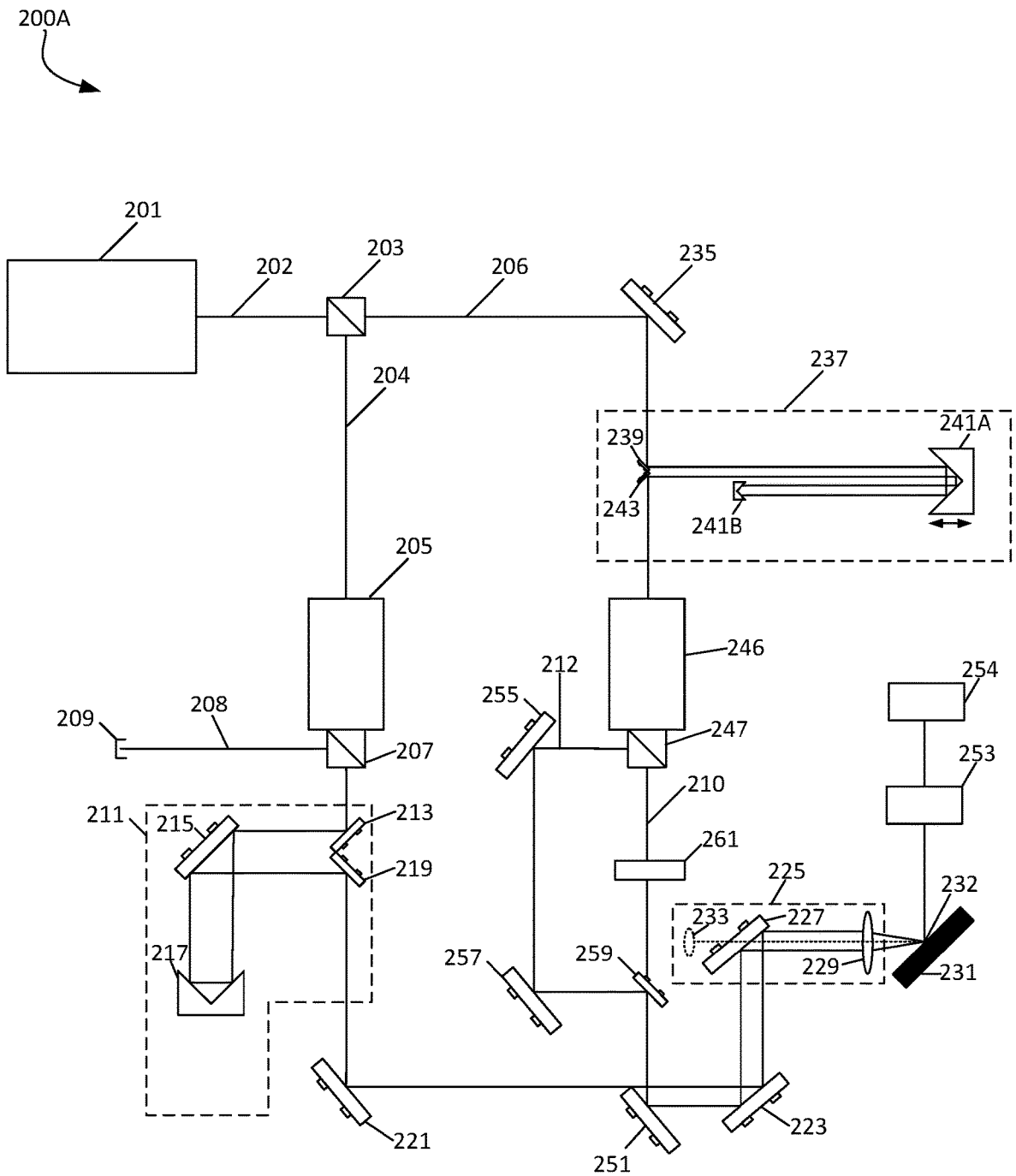
FIG. 2A depicts another example metrology system for inspecting a sample.

FIG. 2A depicts another example metrology system 200A for measuring or inspecting a sample. The system 200A harvests or scavenges probe beam light that is wasted or rejected in other metrology systems, such as the metrology system 100 depicted in FIG. 1B. For example, as discussed above with reference to FIG. 1B, the probe beam splitter 147 split the probe pulse such that a portion of the probe pulse followed the waste or rejected probe light path 110 and was extinguished by the waste or rejected probe beam dump 149. The example metrology system 200A depicted in FIG. 2A harvests that wasted light to allow for multiple measurements to be performed with a single light pulse from a light source.

Similar to the example metrology system 100 discussed above, the example metrology system 200A depicted in FIG. 2A includes a light source 201, such as a laser, that emits a light pulse that travels along beam path 202. A first beam splitter 203 is located in the beam path 202. The first beam splitter 203 splits light pulses emitted from the light source 201 into a pump pulse that follows pump beam path 204 and a pump pulse that follows probe beam path 206.

The pump pulse follows the pump beam path 204 and reaches a pump beam optical modulator 205. The pump beam optical modulator 205 modulates the pump pulses. In some examples, the pump beam optical modulator 205 modulates the pump pulse. The frequency at which the pump pulse is modulated may be in the range of several megahertz (MHz), such as a frequency of about 5 or 5.5 MHz. Other frequencies may also be utilized. The modulated pump pulse then continues to follow the pump beam path 204 and reaches a pump beam splitter 207 located after the pump beam optical modulator 205 in the pump beam path 204. The pump beam splitter 207 splits the modulated pump pulse. A portion of the pump pulse continues along the pump beam path 204 and the remaining portion of the pump pulse that is routed along waste or rejected pump light 208 into a waste or rejected pump beam dump 209, also referred to as a photon motel. As such, the extra light from the pump pulse is wasted.

The portion of the pump pulse that is not wasted continues along the pump beam path 204 into a pump beam delay stage 211. The pump beam delay stage 211 extends the length of the pump beam path 204 and thus increases the time for the pump pulse to reach the measurement point. In some examples, however, the pump beam delay stage 211 may be omitted. The pump beam delay stage 211 includes a first pump beam delay mirror 213, second pump beam delay mirror 215, pump beam delay retroreflector 217, and a third pump beam delay mirror 219. The first pump beam delay mirror 213 directs the pump pulse to the second pump beam delay mirror 215. The second pump beam delay mirror 215 directs the pump pulse to the pump beam delay retroreflector 217. The pump beam delay retroreflector 217 directs the pump pulse back to the second pump beam delay mirror 215, which directs the pump pulse to the third pump beam delay mirror 219. The third pump beam delay mirror 219 directs the pump pulse to a pump beam directional mirror 221. The pump beam directional mirror 221 directs the pump pulse to a directional mirror 223, which directs the pump pulse to a plurality of focusing optics 225. Some elements of the pump beam delay stage 211 may also be adjustable. For instance, position of the pump beam delay retroreflector 217 may be adjusted closer to, or further from, the second pump beam delay mirror 215. As an example, the pump beam delay retroreflector 217 may be on a stage controlled by a motor, a servo, and/or a piezoelectric controller, among other possible controllers. Moving the pump beam delay retroreflector 217 closer to the second pump beam delay mirror 215 shortens the total path length for the pump beam pulse, and thus increases the delay between the pump beam pulse and the probe beam pulse(s). In contrast, moving the pump beam delay retroreflector 217 further from the second pump beam delay mirror 215 lengthens the total path length for the pump beam pulse, and thus shortens the delay between the pump beam pulse and the probe beam pulse(s).

The focusing optics 225 include a focusing mirror 227, a focusing lens 229, and a height detection system 233. The focusing optics 225 are positioned to direct and focus the probe pulse onto the measurement point 232 of the sample 231. In the example depicted in FIG. 2A, the pump pulse continues from the directional mirror 223 along the pump beam path 204 until it reaches the focusing mirror 227. The focusing mirror 227 directs the pump pulse through a focusing lens 229, which focuses the pump pulse to the measurement point 232.

The pump pulse reaches the measurement point 232, which generates the acoustic wave that travels through the bulk of the sample 231. The pump pulse is also reflected from the measurement point 232 and the reflected pump pulse may be captured by the detector 253 or a beam dump (not depicted). In some examples, because the reflected pump pulse is not generally analyzed, the reflected pump beam may be filtered out by the detector 253 or prior to reaching the detector 253.

Returning back to the first beam splitter 203 discussed above, the first beam splitter 203 also splits the light pulse from the light source 201 into a probe pulse that follows probe beam path 206. The probe pulse travels along the probe beam path 206 and is directed by a probe beam directional mirror 235. The probe beam directional mirror 235 directs the probe pulse to a probe beam delay stage 237. The probe beam delay stage 237 is more simple than the extended probe beam delay stage 137 depicted in FIG. 1B. The probe beam delay stage 237 includes only two probe beam delay retroreflectors 241. As such, the total path length of the pump beam cannot be adjusted or lengthened to the degree possible with the extended probe beam delay stage 137 depicted in FIG. 1B. In some examples, however, the probe beam delay stage 237 may be replaced with the extended probe beam delay stage 137.

When the probe pulse reaches the probe beam delay stage 237, a first probe beam delay mirror 239 directs the probe pulse to a first probe beam delay retroreflector 241. The first probe beam delay retroreflector 241A directs the probe pulse to a second probe beam delay retroreflector 241B, which reflects the probe pulse back to the first probe beam delay retroreflector 241A. The first probe beam delay retroreflector 241A then reflects the probe pulse to the second probe beam delay mirror 243.

Like the extended probe beam delay stage 137 depicted in FIG. 1B, the probe beam delay stage 237 may also be adjustable. For example, the first probe beam delay retroreflector 241A on a stage controlled by a motor, a servo, and/or piezoelectric controller. Thus, the first probe beam delay retroreflector 241A may be moved closer to the second probe beam delay retroreflector 241B. Moving the respective probe beam delay retroreflectors 241 closer or further from one another reduces or increases the overall path length for the probe pulse, which reduces or increases the delay between the pump pulse and the probe pulse. Accordingly, if a particular delay time is desired, that delay time can be achieved by adjusting the relative positions of the probe beam delay retroreflectors 241. In an example, the delay may be configured from zero picoseconds to about 4,700 picoseconds.

Once the probe pulse reaches the second probe beam delay mirror 243 from the probe beam delay stage 237, the second probe beam delay mirror 243 directs the probe pulse along the probe beam path 206 to a probe beam optical modulator 246. The probe beam optical modulator 246 modulates the probe pulse at a different frequency than the pump beam light has been modulated. For example, the probe beam optical modulator 246 may modulate the probe pulse at a frequency that is an order of magnitude different than the modulation frequency for the pump beam. For instance, the probe beam may be modulated at about 0.5 MHz. The modulation frequency of the pump beam and the modulation of the probe beam may be represented by a pump-to-probe modulation ratio. In some examples the pump-to-probe modulation ratio may be about 10:1. In other examples, the probe beam may be modulated at a higher frequency than the pump beam. In such examples, the pump-to-probe modulation ratio may be 1:10. Other pump-to-probe modulation ratios may also be used, such as 20:1, 5:1, 2:1, 1:2, 1:5, and 1:20 as well as ranges between those pump-to-probe modulation ratios. In some examples, the pump-to-probe modulation ratio is at least 10:1 or less than 1:10.

By modulating the probe pulse and the pump pulse with different frequencies, light from the pump pulse can be more easily distinguished from the light from the probe pulse. As an example, for samples having a rough surface, light from the pump pulse may scatter upon reflecting from the surface of the sample. Photons from the pump pulse may then reach the detector 153 after reflecting from the sample. That light from the pump pulse, however, may cause errors in the ultimate measurement as only the probe pulse is intended to be analyzed. For instance, the pump beam light may create excessive noise in the signal that is generated from the detector 153. To reduce the undesired effect of the pump pulse photons, the detector 153 may be configured to demodulate the detected light to distinguish pump pulse light from probe pulse light. As such, accuracy may be improved by more analyzing only the probe pulse light by separating out any detected pump pulse light.

The modulated probe pulse then reaches a probe beam splitter 247. The probe beam splitter 247 splits the probe pulse into a primary probe pulse that travels along a primary probe beam path 210 and a secondary probe pulse that travels along a secondary probe beam path 212. The primary probe pulse is similar to, and travels along a similar path as, the probe pulse depicted in FIG. 1B. For instance, the primary probe pulse travels along primary probe beam path 210 and passes through a half-wave plate 261. The half-wave plate 261 alters the polarization of the primary probe pulse, such as by rotating the polarization of the primary probe pulse by 90 degrees. The primary probe pulse is then directed by probe beam directional mirror 251. The probe beam directional mirror 251 directs the probe pulse to the directional mirror 223, which directs the probe pulse to the focusing optics 225.

The secondary probe pulse, however, is harvested and utilized in the system 200A, whereas that light is wasted or rejected in systems such as the example metrology system 100 depicted in FIG. 1B. For instance, the secondary probe pulse travels along secondary probe beam path 212 where it is directed by secondary probe beam directional mirror 255 to another secondary probe beam directional mirror 257. The secondary probe beam directional mirror 257 directs the secondary probe pulse to yet another secondary probe beam directional mirror 259. The secondary probe beam directional mirror 259 directs the secondary probe pulse onto a beam path that is then substantially the same as the beam path for the primary probe pulse. For example, the secondary probe pulse is directed by the probe beam directional mirror 251 to the directional mirror 223, which directs the secondary probe pulse to the focusing optics 225. Due to the extra reflective elements in the secondary probe beam path 212, such as the secondary probe beam directional mirrors 255, 257, 259, the total path length for secondary probe pulse is greater than the total path length for the primary probe pulse. As such, the secondary probe pulse reaches the focusing optics 225, and ultimately the sample 231, after the primary probe pulse.

The focusing optics 225 focus the primary probe pulse and the secondary probe pulse onto the measurement point 232 of the sample 231. For instance, the focusing mirror 227 directs the primary probe pulse and the secondary probe pulse through the focusing lens 229, which focuses the primary probe pulse and the secondary probe pulse onto the measurement point 232. The primary probe pulse and the secondary probe pulse then reflect off the surface of the sample 231 to the detector 253. The detector 253 detects the primary probe pulse and the secondary probe pulse after they have reflected from the measurement point 232. The detector 253 may convert the reflected primary probe pulse and the secondary probe pulse into electrical signals, which may be in a digital or analog format. The detector 253 passes the signals to a signal processing and analysis system 254 where the signals are analyzed. The signal processing and analysis system 254 is able to determine thicknesses of the sample 231 based on the signals received from the detector 253. Additional details regarding a suitable operating environment for the signal processing and analysis system 254 are discussed in further detail below with reference to FIG. 4.

Utilizing the secondary probe pulse in addition to the primary probe pulse allows for multiple measurements to occur as well as deeper thicknesses to be measured. For instance, because the secondary probe pulse reaches the measurement point after the primary probe pulse, both pump pulses can be separately analyzed. Accordingly, two thickness measurements may be made from a single pulse of light from the light source 201, whereas is previous systems, only one measurement was able to be achieved from that single pulse of light. Such an improvement increases the rate at which samples can be measured or inspected. In addition, because the path length of the secondary probe pulse is greater than the path length of the primary probe pulse, the delay between the secondary probe pulse and the pump pulse is also greater. The increase in the delay between the secondary probe pulse and the pump pulse allows for increased thickness measurements for similar reasons as discussed above.

In some examples, the length of the primary probe beam path and the secondary probe beam path may be substantially the same. In such examples, the primary probe pulse and the secondary probe pulse may be combine and reach the measurement point 132 at substantially the same time. Such an example may increase the amplitude of the ultimate probe pulse that reaches the measurement point 132 and is detected by the detector 153. By increasing the amplitude of the probe pulse, the signal-to-noise ratio of the signal from the detector 153 representing the detected probe pulse may be higher—leading to potentially more accurate results or results with higher confidence.

Figure 2B:
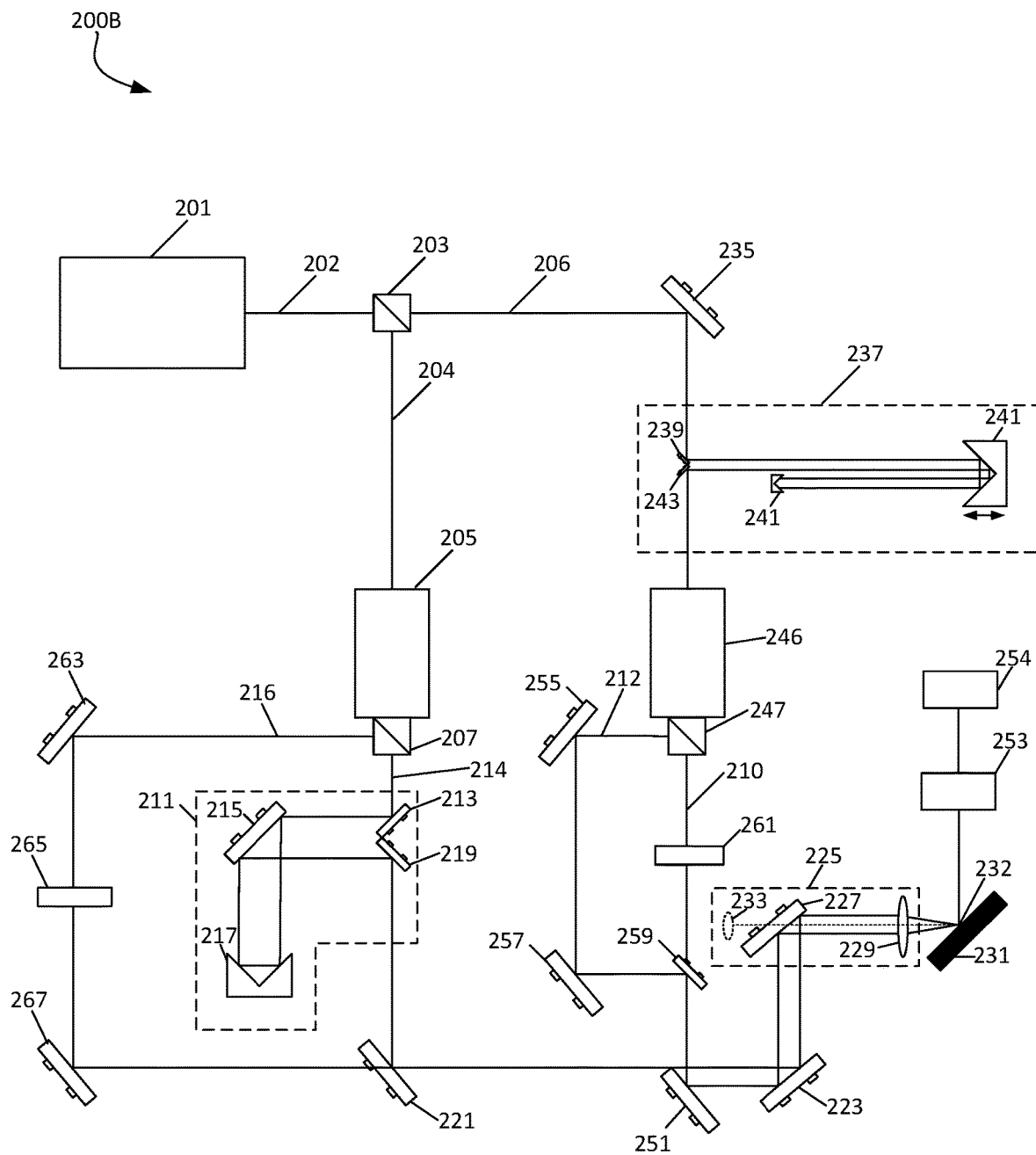
FIG. 2B depicts another example metrology system for inspecting a sample.

FIG. 2B depicts another example metrology system 200B. The system 200B is similar to the system 200A depicted in FIG. 2A, except that previously wasted or rejected light of the pump pulse is also harvested and utilized. For instance, as discussed above with reference to FIG. 1B, when the pump pulse is split by pump beam optical modulator 105 in system 100, a portion of that pump pulse is wasted and directed along waste or rejected pump light path 108 to the waste or rejected pump beam dump 109. The system 200B in FIG. 2B harvests and utilizes that wasted pump beam light to create a secondary pump pulse. The secondary pump pulse is then directed to the measurement point 232 such that it reaches the measurement point 232 after a primary pump pulse. In combination with the primary and secondary probe pulses, the primary and secondary pump pulses allow for two pump-probe beam pairs and thus two separate measurements from a single pulse of light from the light source 201.

More specifically, in the example system 200B depicted in FIG. 2B, the light source 201 emits a light pulse that travels along beam path 202. The first beam splitter 203 is located in the beam path 202, and the first beam splitter 203 splits light pulses emitted from the light source 201 into a pump pulse that follows pump beam path 204 and a probe pulse that follows probe beam path 206. The probe pulse follows the same beam paths as described above with respect to FIG. 2A. The pump pulse, however, is directed and utilized in a different manner.

From the first beam splitter 203, the pump pulse follows pump beam path 204. The pump pulse follows the pump beam path 204 and reaches a pump beam optical modulator 205. The pump beam optical modulator 205 modulates the pump pulse. In some examples, the pump beam optical modulator 205 modulates the pump pulse. The frequency at which the pump pulse is modulated may be in the range of several megahertz (MHz), such as about 5 or 5.5 MHz. Other frequencies may also be utilized. The modulated pump pulse then continues to follow the pump beam path 204 and reaches the pump beam splitter 207 located after the pump beam optical modulator 205 in the pump beam path 204. The pump beam splitter 207 splits the modulated pump pulse into a primary pump pulse that follows primary pump beam path 214 and a secondary pump pulse that follows secondary pump beam path 216. The primary pump beam path 214 is substantially the same as the pump beam path in system 200A depicted in FIG. 2A. The secondary pump beam path 216 in system 200B, however, differs from the beam paths in system 200A.

The secondary pump pulse travels along secondary pump beam path 216 to a secondary pump beam directional mirror 263, which directs the secondary pump pulse through half wave plate 265. The half wave plate 265 alters the polarization of the secondary pump pulse, such as by rotating the polarization of the secondary pump pulse by 90 degrees. Once the secondary pump pulse passes through the half wave plate 265, another secondary pump beam directional mirror 267 directs the secondary pump pulse back onto a trajectory that is substantially the same as the primary pump beam path 214. That is, the secondary pump beam directional mirror 267 directs the secondary pump pulse to the directional mirror 223 which directs the secondary pump pulse to the focusing optics 225 along a similar trajectory as the primary pump pulse.

The focusing optics 225 focus the primary and secondary pump pulses onto the measurement point 232 of the sample 231. Because the secondary pump beam path 216 is longer than the primary pump beam path 214, the secondary pump pulse arrives at the measurement point 232 after the primary pump pulse.

In some examples of system 200B, the optical components in the respective beam paths are arranged such that the primary pump pulse reaches the measurement point 232 first, followed by the primary probe pulse, followed by the secondary pump pulse, and ultimately the secondary probe pulse. That is, the order in which the pump and probe pulses reach the measurement point 232 is as follows: (1) primary pump pulse, (2) primary probe pulse, (3) secondary pump pulse, and (4) secondary probe pulse. That ordering of the pulse timing is achieved by the arrangement of the optical components in the system 200B. For instance, the location of the mirrors and the adjustment of the delay stages can be used to alter the beam path lengths of each of the respective pulses. To achieve the above ordering, the total beam path length for the primary pump pulse is the shortest. The beam path length for the primary probe pulse is longer than the beam path length for the primary pump pulse but shorter than the beam path length for the secondary pump pulse. The beam path length for the secondary pump pulse is shorter than the beam path length for the secondary probe pulse.

In such examples, the primary pump pulse causes a first acoustic wave to propagate through the bulk of the sample. The primary probe pulse is then altered by the first acoustic wave when the primary probe pulse reflects from the measurement point 232. The reflected primary probe pulse is detected by the detector 253 and the signal from the detector may be analyzed to determine a first thickness of a layer of the sample at the measurement point 232. The secondary pump pulse then causes a second acoustic wave to propagate through the bulk of the sample. The secondary probe pulse is then altered by the first acoustic wave when the secondary probe pulse reflects from the measurement point 232. The reflected secondary probe pulse is detected by the detector 253 and the signal from the detector may be analyzed to determine a second thickness of a layer of the sample at the measurement point 232. The detector 253 passes the signals to a signal processing and analysis system 254 where the signals are analyzed. The signal processing and analysis system 254 is able to determine thicknesses of the sample 231 based on the signals received from the detector 253. In some examples, depending on the thicknesses that are to be measured, the secondary probe pulse may reach the measurement point 232 prior to the primary probe pulse reaching the measurement point 232. Additional details regarding a suitable operating environment for the signal processing and analysis system 254 is discussed in further detail below with reference to FIG. 4.

The delay between the primary pump pulse and the primary probe pulse, in part, dictates the amount of the first thickness that can be measured with that primary pump-probe pulse pair. Similarly, the delay between the secondary pump pulse and the secondary probe pulse, in part, dictates the amount of the first thickness that can be measured with that secondary pump-probe pulse pair. In some instances, the delay between the primary pump pulse and the primary probe pulse may be substantially the same as the delay between the secondary pump pulse and the secondary probe pulses. In such instances, the measurement from the primary pump-probe pulse pair is repeated by the secondary pump-probe pulse pair. Such a repetitive measurement may allow for higher confidence in the results of the ultimate analysis. In other instances, the delay between the primary pump pulse and the primary probe pulse may differ from the delay between the secondary pump pulse and the secondary probe pulses. In such instances, the first pump-probe pulse pair can be used to measure a first thickness and the second pump-probe pulse pair can be used to measure a second thickness that is different from the first thickness.

Figure 2C:
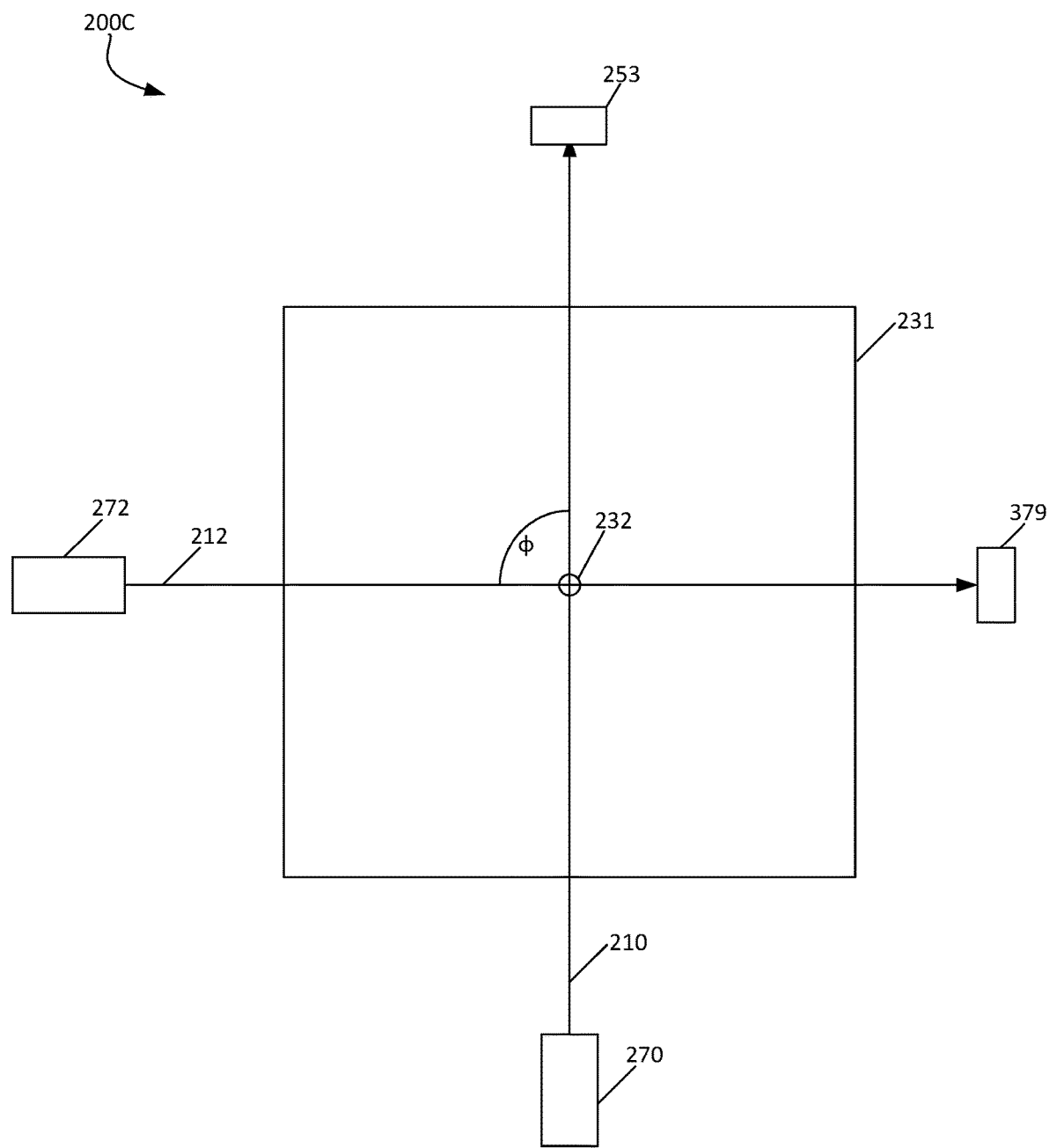
FIG. 2C depicts a portion of an example metrology system for inspecting a sample.

FIG. 2C depicts a portion of an example metrology system 200C for measuring or inspecting a sample 231. More specifically, FIG. 2C depicts a top view of the sample 231. In the example depicted, the primary probe beam path 210 reaches the measurement point 232 at a first azimuthal angle and the secondary probe beam path 212 reaches the measurement point 232 at a second azimuthal angle. Because of the different azimuthal angles of the primary probe beam path 210 and the secondary probe beam path 212, a first detector 253 and a second detector 379 may be required. For example, the primary probe pulse travels along the primary probe beam path 210, reflects off the measurement point 232, and is detected by the first detector 253. The secondary pulse travels along the secondary probe beam path 212, reflects off the measurement point 232, and is detected by the detector 379.

An angle ($\varphi$) is defined between the primary probe beam path 210 and the secondary probe beam path 212. In the example depicted in FIG. 2C, the primary probe beam path 210 and the secondary probe beam path 212 are orthogonal to one another, and thus the angle ($\varphi$) is about 90 degrees. In other examples, the primary probe beam path 210 and the secondary probe beam path 212 need not be orthogonal to one another. For instance, in some examples the angle ($\varphi$) is between about 45 degrees to about 135 degrees, 45 degrees to 90 degrees, 90 degrees to about 135 degrees, 60 degrees to 120 degrees, and 80 degrees to 100 degrees. The azimuthal angle may be selected based on the angles that provide the maximum reflectivity from the measurement point on the sample. To achieve the different azimuthal angles of the primary probe beam path 210 and the secondary probe beam path 212, two sets of focusing optics may be used. In addition, or alternatively, fiber optic components may be integrated into the metrology system to direct to the probe pulses to the measurement point 232. For example, a first optical fiber 270 may direct the primary pump pulse to the measurement point 232 and a second optical fiber 272 may direct the secondary pump pulse to the measurement point 232. In some examples, the pump beam(s) may also be directed through one or more optical fibers. For instance, the primary pump beam may be directed through the first optical fiber 270 or another optical fiber adjacent the first optical fiber 270. The secondary pump beam may be directed through the second optical fiber 272 or another optical fiber adjacent the second optical fiber 272.

Figure 3A:
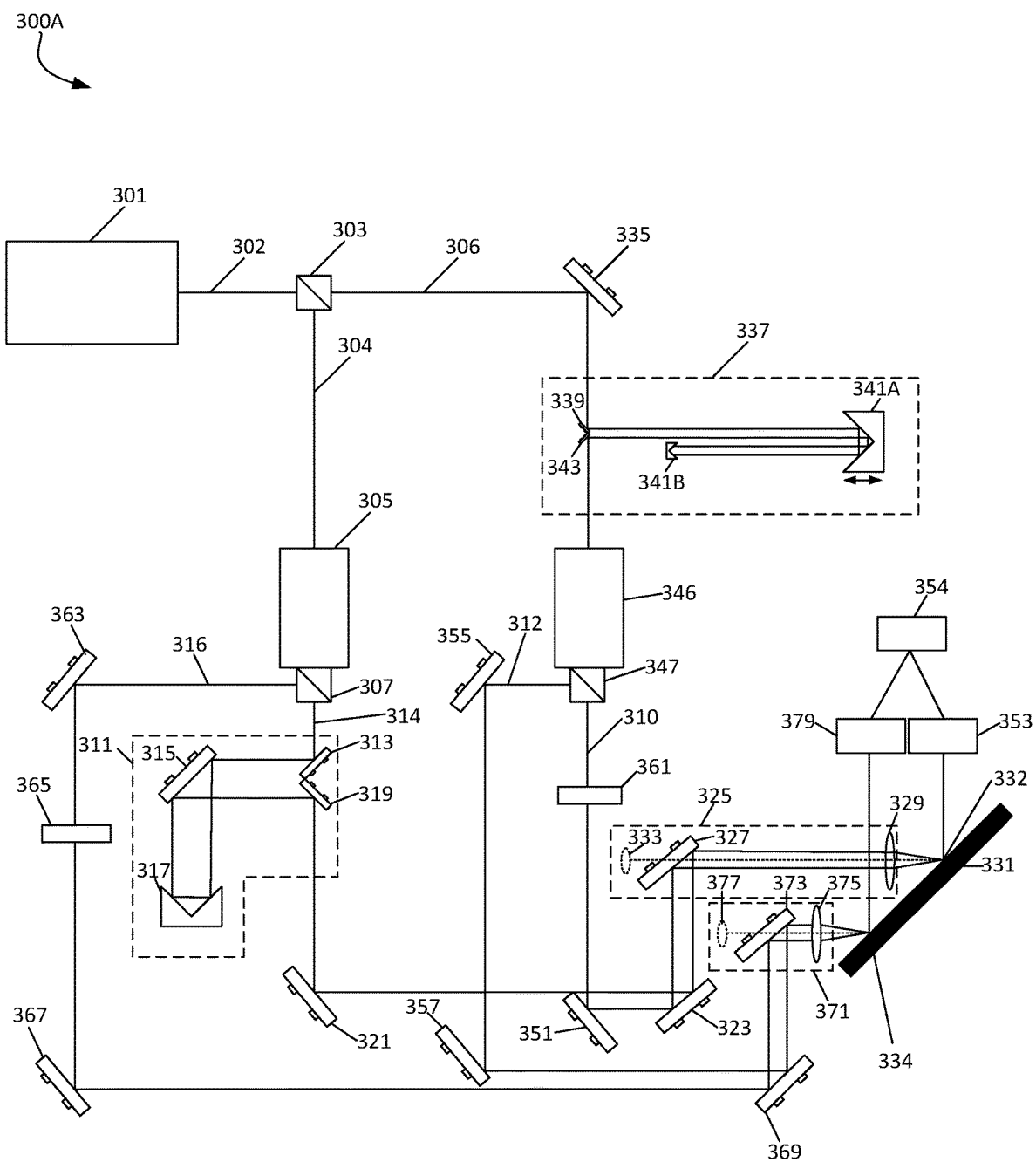
FIG. 3A depicts another example metrology system for inspecting a sample.

FIG. 3A depicts another example metrology system 300A. Similar to the system 200B in FIG. 2B described above, the system 300A in FIG. 3A harvests previously wasted or rejected pump beam light and probe light to make multiple measurements from a single pulse of light. The system 300A, however, is configured to measure two different locations of the sample with a single pulse of light. To do so, the system 300A is configured such that a primary pump pulse and a primary probe pulse are directed to a first measurement point 332 on a sample 331, and the secondary pump pulse and the secondary probe pulse are directed to a second measurement point 334 on the sample 331.

In the example system 300A depicted in FIG. 3A, a light source 301 emits a light pulse that travels along beam path 302. The first beam splitter 303 is located in the beam path 302, and the first beam splitter 303 splits light pulses emitted from the light source 301 into a pump pulse that follows pump beam path 304 and a probe pulse that follows probe beam path 306. From the first beam splitter 303, the pump pulse follows pump beam path 304 and reaches a pump beam optical modulator 305. The pump beam optical modulator 305 modulates the pump pulse. In some examples, the pump beam optical modulator 305 modulates the pump pulse. The frequency at which the pump pulse is modulated may be in the range of several megahertz (MHz), such as about 5 or 5.5 MHz. Other frequencies may also be utilized. The modulated pump pulse then continues to follow the pump beam path 304 and reaches the pump beam splitter 307 located after the pump beam optical modulator 305 in the pump beam path 304. The pump beam splitter 307 splits the modulated pump pulse into a primary pump pulse that follows primary pump beam path 314 and a secondary pump pulse that follows secondary pump beam path 316.

The primary pump pulse enters pump beam delay stage 311. The pump beam delay stage 311 extends the length of the pump beam path 304 and thus increases the time for the pump pulse to reach the first measurement point 332. In some examples, however, the pump beam delay stage 311 may be omitted. The pump beam delay stage 311 includes a first pump beam delay mirror 313, second pump beam delay mirror 315, pump beam delay retroreflector 317, and a third pump beam delay mirror 319. The first pump beam delay mirror 313 directs the primary pump pulse to the second pump beam delay mirror 315. The second pump beam delay mirror 315 directs the primary pump pulse to the pump beam delay retroreflector 317. The pump beam delay retroreflector 317 directs the primary pump pulse back to the second pump beam delay mirror 315, which directs the primary pump pulse to the third pump beam delay mirror 319. The third pump beam delay mirror 319 directs the primary pump pulse to a pump beam directional mirror 321. The pump beam directional mirror 321 directs the primary pump pulse to a directional mirror 323. Some elements of the pump beam delay stage 311 may also be adjustable. For instance, position of the pump beam delay retroreflector 317 may be adjusted closer to, or further from, the second pump beam delay mirror 315. As an example, the pump beam delay retroreflector 317 may be on a stage controlled by a motor, a servo, and/or a piezoelectric controller, among other possible controllers. Moving the pump beam delay retroreflector 317 closer to the second pump beam delay mirror 315 shortens the total path length for the primary pump beam pulse, and thus increases the delay between the primary pump beam pulse and the probe beam pulse(s). In contrast, moving the pump beam delay retroreflector 317 further from the second pump beam delay mirror 315 lengthens the total path length for the primary pump beam pulse, and thus shortens the delay between the pump beam pulse and the probe beam pulse(s).

The directional mirror 323 directs the primary pump pulse to a first set of focusing optics 325. The first set of focusing optics 325 includes a focusing mirror 327, a focusing lens 329, and a height detection system 333. The focusing optics 325 are positioned to direct and focus the primary pump pulse onto a first measurement point 332 of the sample 331. In the example depicted in FIG. 3A, the pump pulse continues from the directional mirror 323 to the focusing mirror 127. The focusing mirror 127 directs the primary pump pulse through a focusing lens 129, which focuses the pump pulse to the first measurement point 332.

The primary pump pulse reaches the first measurement point 332, which generates an acoustic wave that travels through the bulk of the sample 131 at the first measurement point 332. The pump pulse is also reflected from the measurement point 332, and the reflected pump pulse may be captured by a detector 353 or a beam dump (not depicted). In some examples, because the reflected primary pump pulse is not generally analyzed, the reflected pump pulse may be filtered out by the detector 353 or filtered out prior to reaching the detector 353. For instance, lock-in detection methods may be implemented.

The secondary pump pulse follows the secondary pump beam path 316 from the pump beam splitter 307. The secondary pump pulse is reflected by secondary pump beam directional mirror 363 through half wave plate 365. The half wave plate 365 alters the polarization of the secondary pump pulse, such as by rotating the polarization of the secondary pump pulse by 90 degrees. Once the secondary pump pulse passes through the half wave plate 365, another secondary pump beam directional mirror 367 directs the secondary pump pulse to a secondary-beams directional mirror 369. Accordingly, unlike the secondary pump pulse in system 200B depicted in FIG. 2B, the secondary pump pulse here in system 300A is not routed onto the same beam path as the primary pump pulse. Instead, the secondary pump pulse in system 300A is routed to the secondary-beams directional mirror 369, which directs the secondary pump pulse to a second set of focusing optics 371. The second set of focusing optics 371 directs the secondary pump pulse onto a second measurement point 334 of the sample 331.

The second set of focusing optics 371 is similar to the first set of focusing optics 325, except that the second set of focusing optics 371 directs the secondary pump pulse onto a second measurement point 334 of the sample 331 rather than the first measurement point 332 of the sample 331. More specifically, the second set of focusing optics 371 includes a second focusing mirror 373, a second focusing lens 329, and a second height detections system 377. The secondary pump pulse is directed by the second focusing mirror 373 through the second focusing lens 375, which focuses the second pump pulse to the second measurement point 334 on the sample 331.

Returning back to the first beam splitter 303 discussed above, the first beam splitter 303 also splits the light pulse from the light source 301 into a probe pulse that follows probe beam path 306. The probe pulse travels along the probe beam path 306 and is directed by a probe beam directional mirror 335. The probe beam directional mirror 335 directs the probe pulse to a probe beam delay stage 337. The probe beam delay stage 337 is substantially the same as the probe beam delay stage 237 describe above and depicted in FIGS. 2A-2B. In some examples, however, the probe beam delay stage 337 may be replaced with the extended probe beam delay stage 137 depicted in FIG. 1B.

In the example system 300A depicted in FIG. 3A, when the probe pulse reaches the probe beam delay stage 337, a first probe beam delay mirror 339 directs the probe pulse to a first probe beam delay retroreflector 341. The first probe beam delay retroreflector 341A directs the probe pulse to a second probe beam delay retroreflector 341B, which reflects the probe pulse back to the first probe beam delay retroreflector 341A. The first probe beam delay retroreflector 341A then reflects the probe pulse to the second probe beam delay mirror 343.

Like the probe beam delay stage 237 depicted in FIGS. 2A-2B, the probe beam delay stage 337 may also be adjustable. For example, the first probe beam delay retroreflector 341A on a stage controlled by a motor, a servo, and/or piezoelectric controller. Thus, the first probe beam delay retroreflector 341A may be moved closer to the second probe beam delay retroreflector 341B. Moving the respective probe beam delay retroreflectors 341 closer or further from one another reduces or increases the overall path length for the probe pulse, which reduces or increases the delay between the pump pulse and the probe pulse. Accordingly, if a particular delay time is desired, that delay time can be achieved by adjusting the relative positions of the probe beam delay retroreflectors 341. In an example, the delay may be configured from zero picoseconds to about 4,700 picoseconds.

Once the probe pulse reaches the second probe beam delay mirror 343 from the probe beam delay stage 337, the second probe beam delay mirror 343 directs the probe pulse along the probe beam path 306 to a probe beam optical modulator 346. The probe beam optical modulator 346 may modulate the probe pulse at a frequency different than the modulation of the pump pulse. For instance, the probe pulse may be modulated at a frequency of 0.5 MHz. Other frequencies may also be used. For example, modulation frequencies that satisfy the pump-to-probe modulation ratios discussed above may be utilized. The modulated probe pulse then reaches a probe beam splitter 347. The probe beam splitter 347 splits the probe pulse into a primary probe pulse that travels along a primary probe beam path 310 and a secondary probe pulse that travels along a secondary probe beam path 312.

The primary probe pulse travels along primary probe beam path 310 and passes through a half-wave plate 361. The half-wave plate 361 alters the polarization of the primary probe pulse, such as by rotating the polarization of the primary probe pulse by 90 degrees. The primary probe pulse is then directed by probe beam directional mirror 351 to the directional mirror 323, which directs the primary probe pulse to the first set of focusing optics 325. The first set of focusing optics 325 directs the primary probe pulse to the first measurement point 332 on the sample 331. The primary probe pulse reflects off the first measurement point 332 of the sample 331 and the reflected primary probe pulse is detected by a first detector 353. The first detector 353 generates one or more signals based on the detected reflected primary probe pulse. The signal processing and analysis system 354 is able to determine a thicknesses of the sample 331 at the first measurement point 332 based on the signals received from the detector 353. Additional details regarding a suitable operating environment for the signal processing and analysis system 354 are discussed in further detail below with reference to FIG. 4.

The secondary probe pulse travels from the probe beam splitter 347 to the secondary probe beam directional mirror 355 along the secondary probe beam path 312. The secondary probe beam directional mirror 355 directs the secondary pump pulse to the secondary probe beam directional mirror 357, which directs the secondary pump pulse to the secondary-beams directional mirror 369. The secondary-beams directional mirror 369 directs the secondary probe pulse to the second set of focusing optics 371. The second set of focusing optics 371 directs the secondary probe pulse to the second measurement point 334 on the sample 331. The secondary probe pulse reflects off the second measurement point 334, and the reflected secondary probe pulse is detected by the second detector 379. The second detector 379 generates one or more signals based on the detected reflected primary probe pulse. The signal processing and analysis system 354 is able to determine a thicknesses of the sample 331 at the second measurement point 334 based on the signals received from the detector 379. In some examples, the first detector 353 and the second detector 379 may be part of single housing or a single detector. For instance, rather than having two detectors, a single large detector may be implemented.

Accordingly, the primary pump pulse and the primary probe pulse are directed to the first measurement point 332 and the secondary pump pulse and the secondary probe pulse are directed to the second measurement point 334. In some instances, the primary pump pulse may reach the first measurement point 332 at approximately the same time as the secondary pump pulse reaches the second measurement point 334. In such instances, the beam path length of the primary pump pulse and the secondary pump pulse are substantially the same. In other examples, the primary pump pulse may reach the first measurement point 332 at a different time than the secondary pump pulse reaches the second measurement point 334.

The primary probe pulse, however, reaches the first measurement point 332 after the primary pump pulse. Similarly, the secondary probe pulse reaches the second measurement point 334 after the secondary pump pulse. Thus, the primary probe pulse has a longer beam path length than the primary pump pulse, and the secondary probe pulse has a longer beam path length that the secondary pump pulse.

Figure 3B:
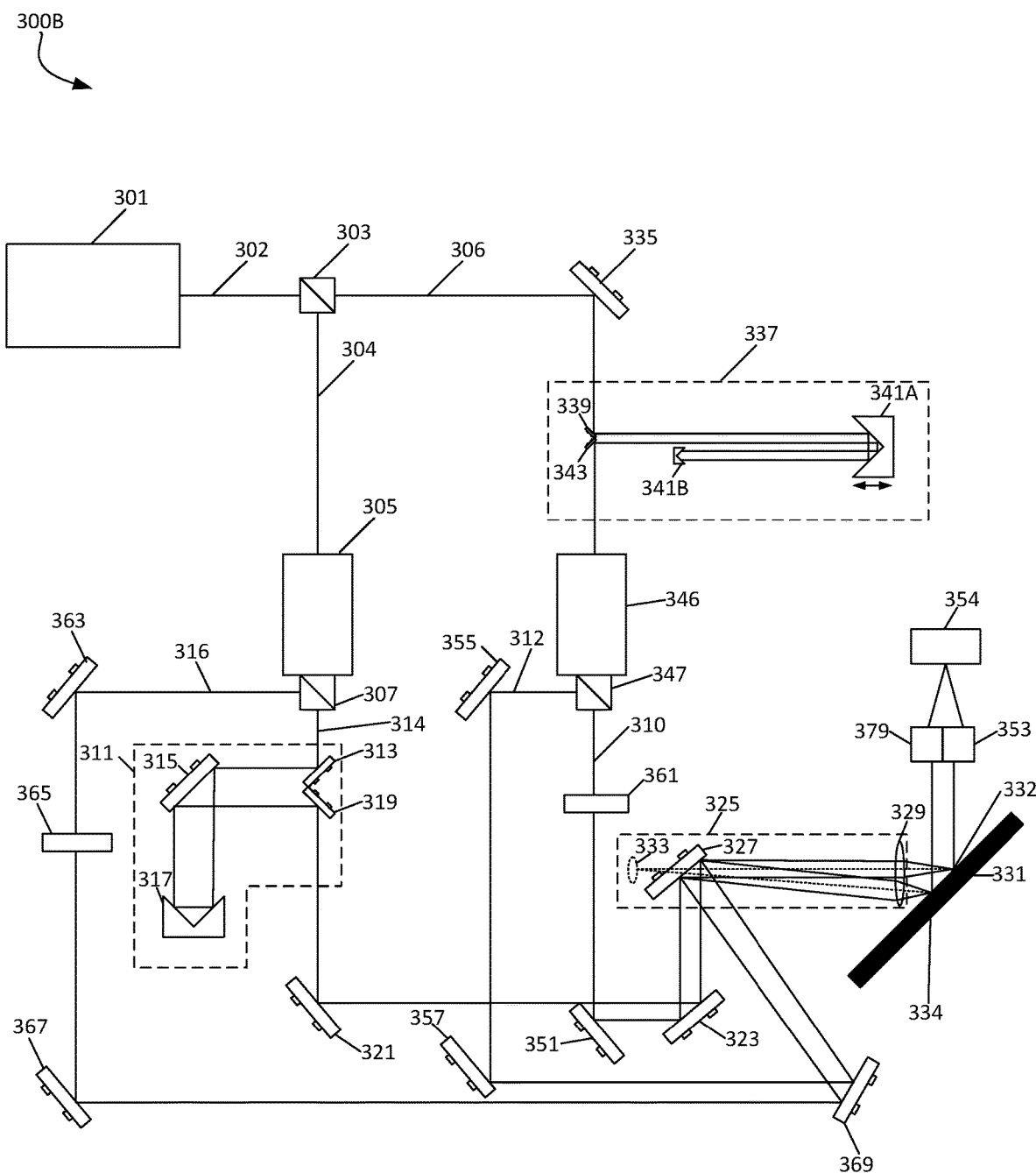
FIG. 3B depicts another example metrology system for inspecting a sample.

FIG. 3B depicts another example metrology system 300B. The metrology system 300B is similar to the metrology system 300A depicted in FIG. 3B in that the metrology system 300B also has the ability to measure two different measurement points on a sample with a single pulse of light. The system 300B, however, is capable of such measurements with a single set of focusing optics, whereas the system 300A included two sets of focusing optics. In the example depicted, the difference is achieved by positioning the secondary-beams directional mirror 369 such that the secondary pump pulse and the secondary probe pulse are directed to the focusing mirror 327 in the focusing optics 325. The primary pump pulse and the primary probe pulse are also directed to the focusing mirror 327. The angles of incidence of the primary pump and probe pulses into the focusing mirror 327 are different from the angles of incidence of the secondary pump and probe pulse into the focusing mirror. As a result, the primary pump and probe pulses are directed to a first measurement point 332 and the secondary pump and probe pulses are directed to a second measurement point 334.

Many of the components in system 300B are substantially similar to the components in system 300A. For instance, the system 300B includes the light source 301 that emits pulses of light. A pulse of light from the light source 301 is split by the beam splitter 303 into a pump pulse that follows pump beam path 304 and a probe pulse that follows probe beam path 306. The pump pulse is modulated by the pump beam optical modulator 305 and the modulated pump pulse is split by the pump beam splitter 307 into a primary pump pulse that follows the primary pump beam path 314 and a secondary pump pulse that follows the secondary pump beam path 316.

The primary pump pulse travels through the pump beam delay stage 311 and is directed by the pump beam directional mirror 321 to the directional mirror 323, which directs the primary pump pulse to the focusing optics 325. The focusing optics 325 direct the primary pump pulse to the first measurement point 332 on the sample 331. For example, the focusing mirror 327 directs the primary pump pulse through the focusing lens 329, which focuses the primary pump pulse onto the first measurement point 332 of the sample.

The secondary pump pulse is directed by the secondary pump beam directional mirror 363 through the half wave plate 365 and then directed by the secondary pump beam directional mirror 367 to the secondary-beams directional mirror 369. The secondary-beams directional mirror 369 directs the secondary pump pulse to the focusing optics 325. The focusing optics 325 direct the secondary pump pulse to the second measurement point 334 on the sample 331. For example, the focusing mirror 327 directs the secondary pump pulse through the focusing lens 329, which focuses the secondary pump pulse onto the second measurement point 334 of the sample 331.

Returning to the first beam splitter 303, the probe pulse travels along the probe beam path 306 and is directed by the probe beam directional mirror 335 to the probe beam delay stage 337. The probe pulse travels through the probe beam delay stage 337 to the probe beam modulator 346. The modulated probe pulse is split by probe beam splitter 347 into a primary probe pulse that follows primary probe beam path 310 and a secondary probe pulse that follows secondary probe beam path 312. The primary probe pulse travels through the half-wave plate 361 and is directed by the probe beam directional mirror 351 to the directional mirror 323, which directs the primary probe pulse to the focusing optics 325. The focusing optics 325 direct the primary probe pulse to the first measurement point 332 on the sample 331. The primary probe pulse reflects off the first measurement point 332 and travels to the first detector 353 where the first detector 353 detects the reflected primary probe beam. The first detector 353 generates one or more signals based on the detected reflected primary probe pulse. The signal processing and analysis system 354 is able to determine a thicknesses of the sample 331 at the first measurement point 332 based on the signals received from the first detector 353. Additional details regarding a suitable operating environment for the signal processing and analysis system 354 is discussed in further detail below with reference to FIG. 4.

The secondary probe pulse travels along secondary probe beam path 312 where it is directed by the secondary probe beam directional mirror 355, which directs the secondary probe beam to the secondary probe beam directional mirror 357. The secondary probe beam directional mirror 357 directs the secondary probe pulse to the secondary-beams directional mirror 369, which directs the secondary probe pulse to the second measurement point 334 on the sample 331. The secondary probe pulse reflects off the second measurement point 334 and travels to the second detector 379 where the second detector 379 detects the reflected secondary probe pulse. The second detector 379 generates one or more signals based on the detected reflected primary probe pulse. The signal processing and analysis system 354 is able to determine a thicknesses of the sample 331 at the second measurement point 334 based on the signals received from the second detector 379.

In some examples, the focusing lens 329 may be larger in diameter than the focusing lenses in the other examples described above to accommodate both the primary pump and probe pulses and the secondary pump and probe pulses. In other examples, the focusing lens 329 may instead be two focusing lenses, such as a first focusing lens for the primary pump and probe pulses and a second focusing lens for the secondary pump and probe pulses.

The foregoing examples are generally discussed in terms of a single pulse of light from a light source traveling through the example metrology systems. In practice, multiple pulses of light are emitted by the light source and each of the pulses of light are directed by the optical components of the example systems in the same manner. Other methods for generating pulses of light may also be implemented. As used herein, the beam path lengths of the respective the pulses are measured from the light source to the respective measurement point. For example, in the example system 300B in FIG. 3B, the beam path length of the primary probe beam is measured from the light source 301 to the first measurement point 332. In turn, the beam path length of the secondary probe beam is measured from the light source 301 to the second measurement point 334.

In addition, a greater or fewer number of optical components may be included in the examples described above that may be configured to achieve substantially the same functionality. For example, an additional delay stage may be included in the secondary pump beam path or the secondary probe beam path. Including such a delay stage in the secondary probe beam path allows for an additional increase in the delay between the respective pump pulse and probe pulse. Similarly, an additional delay stage may also be included in the secondary pump beam path. The half-wave plates described above may also be omitted in some examples or located in different beam paths. For instance, the half-wave plate generally described above as being in the primary probe beam path may be alternatively placed in the secondary probe beam path. The half-wave plate discussed above as being in the secondary pump beam path may also alternatively be located in the primary pump beam path.

Figure 4:
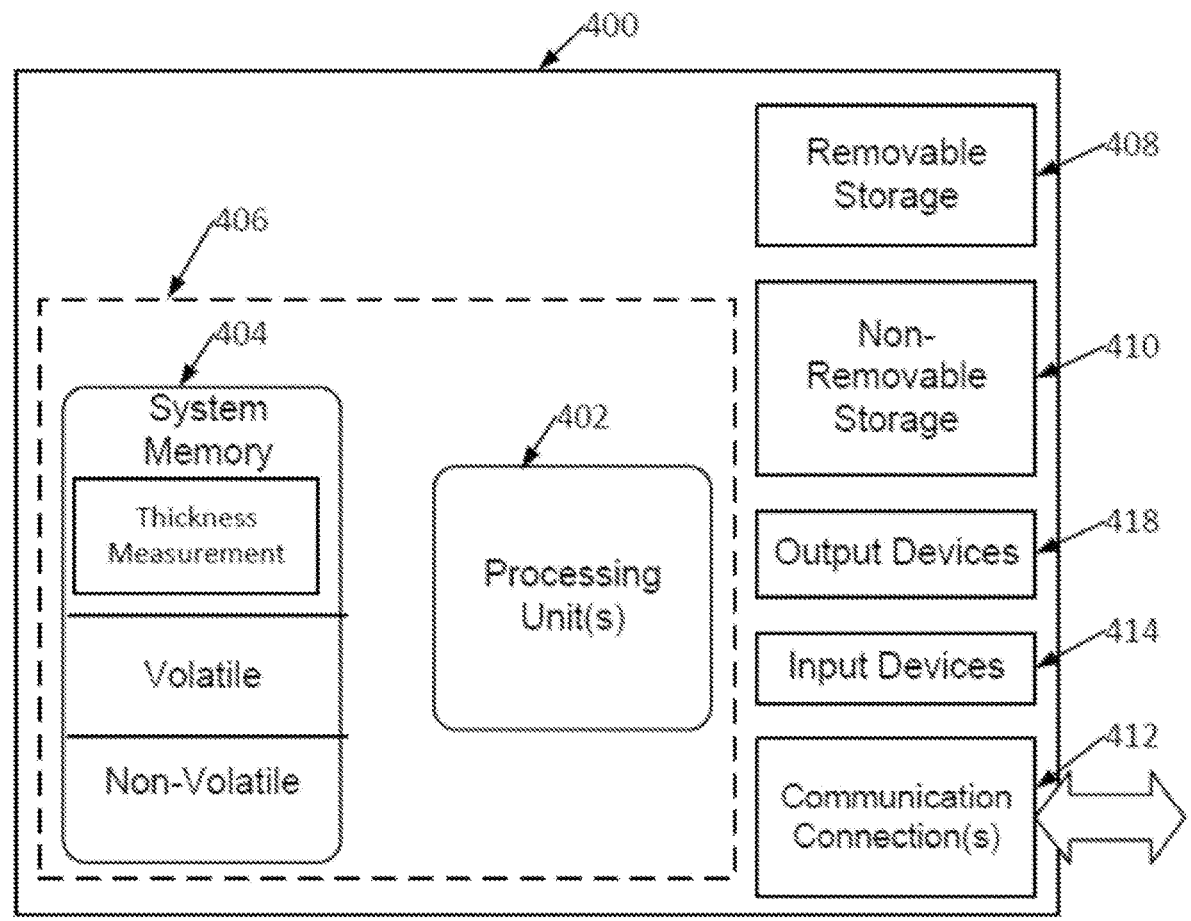
FIG. 4 depicts an example of a suitable operating environment for analyzing signals.

FIG. 4 illustrates one example of a suitable operating environment 400 in which one or more of the present examples of signal processing and analysis systems may be implemented, such as the signal processing and analysis system 154, 254, and/or 354. This operating environment may be incorporated directly into the systems disclosed herein, or may be incorporated into a computer system discrete from, but used to control, the metrology systems described herein. This is only one example of a suitable operating environment and is not intended to suggest any limitation as to the scope of use or functionality. Other computing systems, environments, and/or configurations that can be suitable for use include, but are not limited to, imaging systems, personal computers, server computers, hand-held or laptop devices, multiprocessor systems, microprocessor-based systems, programmable consumer electronics such as smart phones, network PCs, minicomputers, mainframe computers, tablets, distributed computing environments that include any of the above systems or devices, and the like.

In its most basic configuration, operating environment 400 typically includes at least one processing unit 402 and memory 404. Depending on the exact configuration and type of computing device, memory 404 (storing, among other things, instructions to perform the image acquisition and processing methods disclosed herein) can be volatile (such as RAM), non-volatile (such as ROM, flash memory, etc.), or some combination of the two. This most basic configuration is illustrated in FIG. 4 by dashed line 406. Further, environment 400 can also include storage devices (removable, 408, and/or non-removable, 410) including, but not limited to, magnetic or optical disks or tape. Similarly, environment 400 can also have input device(s) 414 such as touch screens, keyboard, mouse, pen, voice input, etc., and/or output device(s) 416 such as a display, speakers, printer, etc. Also included in the environment can be one or more communication connections 412, such as LAN, WAN, point to point, Bluetooth, RF, etc.

Operating environment 400 typically includes at least some form of computer readable media. Computer readable media can be any available media that can be accessed by processing unit 402 or other devices comprising the operating environment. As an example, the operating environment may include at least one processor and memory operatively connected to the at least one processor. The memory stores instructions, that when executed by the at least one processor cause the system to perform a set of operations, such as the operations described herein including the method operations discussed below with reference to FIGS. 6-8.

By way of example, and not limitation, computer readable media can comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, solid state storage, or any other tangible medium which can be used to store the desired information. Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media. A computer-readable device is a hardware device incorporating computer storage media.

The operating environment 400 can be a single computer operating in a networked environment using logical connections to one or more remote computers. The remote computer can be a personal computer, a server, a router, a network PC, a peer device or other common network node, and typically includes many or all of the elements described above as well as others not so mentioned. The logical connections can include any method supported by available communications media. Such networking environments are commonplace in offices, enterprise-wide computer networks, intranets and the Internet.

In some embodiments, the components described herein comprise such modules or instructions executable by computer system 400 that can be stored on computer storage medium and other tangible mediums and transmitted in communication media. Computer storage media includes volatile and non-volatile, removable and non-removable media implemented in any method or technology for storage of information such as computer readable instructions, data structures, program modules, or other data. Combinations of any of the above should also be included within the scope of readable media. In some embodiments, computer system 400 is part of a network that stores data in remote storage media for use by the computer system 400.

Figure 5:
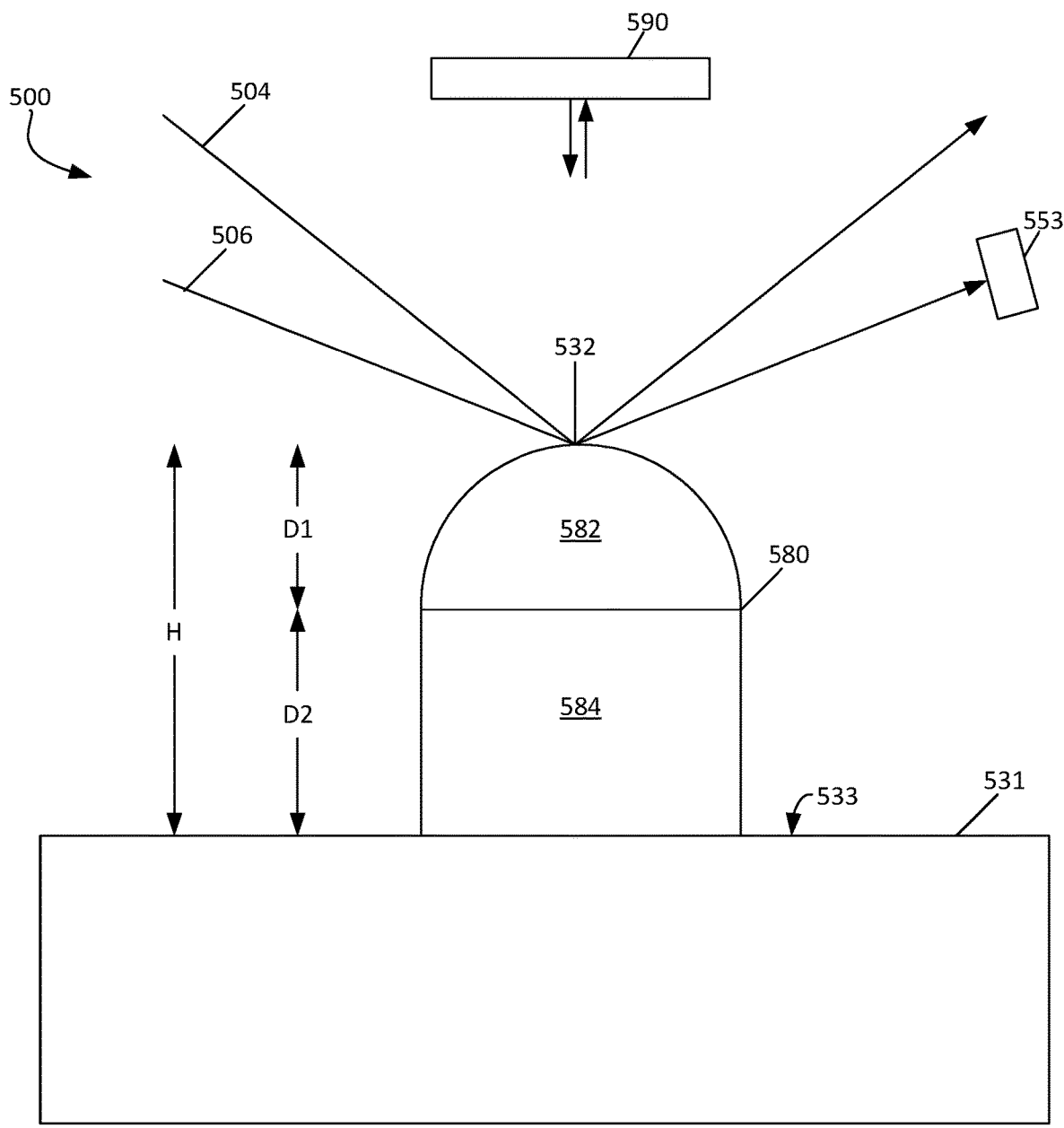
FIG. 5 depicts a portion of an example metrology system for inspecting a sample having a pillar.

FIG. 5 depicts a portion of an example metrology system 500 for measuring or inspecting a sample 531 having a pillar 580. The pillar 580 protrudes from a surface 533 of the sample, and the pillar may have a first layer 582 made from a first material and a second layer 584 made of a second material. In some examples, the first material may be tin-silver (SnAg) and the second material may be copper (Cu) or nickel (Ni). Other materials may also implemented and analyzed with the technology described herein. The metrology system 500 is used to measure the thicknesses of the layers within the pillar 580.

The metrology system 500 may include many of the same components as the metrology systems discussed above with reference to FIGS. 1-4. Accordingly, a pump pulse may be generated and directed along a pump beam path 504 to an measurement point 532 and a probe pulse may be directed along probe beam path 106 to the measurement point 532. When the pump pulse reaches the measurement point 532, an acoustic wave is generated into the bulk of the pillar 580. The acoustic wave propagates through the first layer 582 and is at least partially reflected at the transition between the first layer 582 and the second layer 584. The probe pulse is altered by that reflected acoustic wave, and the reflected probe beam is detected by a detector 553. A determination of thickness, or internal depth D1, of the first layer 582 may then be determined by analyzing the detected probe pulse (or a signal representative of the detected probe pulse).

The metrology system 500 may also include an external height measurement system 590. The external height measurement system 590 measures the external height H of the pillar 580. The external height measurement system 590 may be an optical interferometry system, such as a scanning white light interferometer (SWLI) system. In such examples, the external height H of the pillar 580 may be measured using interferometry. In other examples, the external height measurement system 590 may be a mechanical measurement system, an acoustic or sonar measurement system, and/or an optical measurement system. After measuring the external height H of the pillar 580 and internal depth D1 of the first layer 582, the thickness D2 or height of the second layer 584 above the surface 533 of the sample 531 may be determined. For instance, the internal depth D1 may be subtracted from the external height H to determine the thickness D2 of second layer 584 above the surface 533. While the system 500 is described as specifically including a pillar 580, the system 500 may be used with any protruding structure having multiple layers of material in addition to a pillar.

Figure 6:
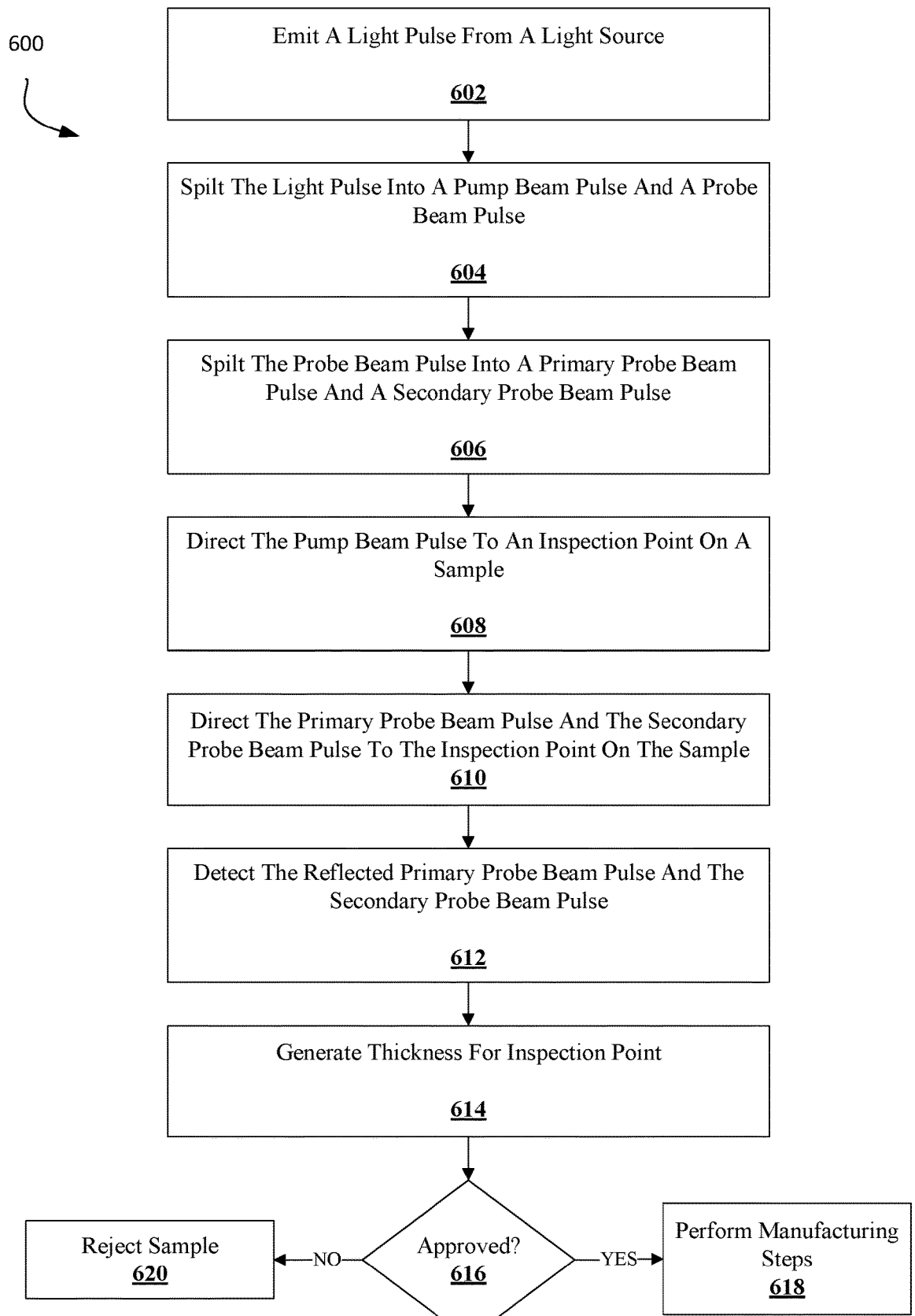
FIG. 6 depicts an example method for inspecting a sample.

FIG. 6 depicts an example method 600 for measuring or inspecting a sample. At operation 602, a light pulse is emitted from a light source, such as a laser. At operation 604, the light pulse is split into a pump pulse and a probe pulse. The light pulse may be split by a beam splitter, such as a beam splitter discussed in FIGS. 1B, 2A-2B, and 3A-B. In some examples, the pump beam and/or the probe beam may be modulated. The probe beam may be modulated at a different frequency than the pump beam. In other examples, only the pump beam may be modulated. At operation 606, the probe pulse is split into a primary probe pulse and a secondary probe pulse. At operation 608, the pump pulse is directed to an measurement point on the sample. The pump pulse may be directed by a plurality of optical components, such as a set of focusing optics. At operation 610, the primary probe pulse and the secondary probe pulse are directed to the measurement point on the sample. The pump beam may have a polarization that is different from the polarization of at least one of the primary probe pulse and the secondary probe pulse. In some examples, the primary probe pulse may have a polarization that is different from the polarization of the secondary probe pulse when each respective probe pulse reaches the measurement point. In addition, directing the primary probe pulse and the secondary probe pulse to the measurement point may include directing the primary probe pulse to the measurement point at a first azimuthal angle and directing the secondary probe pulse to the measurement point at a second azimuthal angle.

The timings of the respective pulses may be configured such that the pump pulse reaches the measurement point prior to the primary probe pulse and the secondary probe pulse. The primary probe pulse may then reach the measurement point subsequent to the pump pulse and the secondary probe pulse reaches the measurement point after the primary pump pulse. Such timing may be achieved by positioning optical components such that the beam path length of the pump pulse is shorter than the beam path length of primary probe pulse, which is shorter than a beam path length of the secondary probe pulse. In some examples, the primary probe pulse reaches the measurement point less than 9 nanoseconds after the pump pulse reaches the measurement point, and the secondary probe pulse reaches the measurement point at least 9 nanoseconds after the pump pulse reaches the measurement point. For instance, the secondary probe pulse may reach the measurement point several nanoseconds after the primary probe pulse.

At operation 612, the reflected primary probe pulse and the secondary probe pulse are detected. For example, as discussed above, when the primary and secondary probe pulse reach the measurement point, they reflect off the sample. The reflected probe pulses then reach a detector which detects the reflected probe pulses. Detecting the primary and secondary probe pulses may also include generating one or more signals representing the reflected primary and secondary probe pulses. For example, the detector may convert the light in the probe pulses to electrical signals that can be processed and analyzed. At operation 614, a thickness for the sample at the measurement point is generated based on analyzing at least one of the detected primary probe pulse and/or the detected secondary probe pulse. For example, the signal representing the detected primary probe pulse and the signal representing the detected secondary probe pulse can be analyzed to determine the effect of the acoustic wave, generated by the pump pulse, on either or both of detected the pump pulses. Based on the delay between the pump pulse and the primary and secondary probe pulses, a thickness of the sample can be determined and generated. The thickness generated may be for one or more layers within the sample.

In some examples, the pump beam may also be split into a primary pump beam and a secondary pump beam. The primary pump beam and the secondary pump beam are directed to the measurement point. In such examples, the primary pump beam may reach the measurement point prior to the primary probe beam, and the secondary pump beam may reach the measurement point subsequent to the primary probe beam. The secondary probe beam then reaches the measurement point subsequent to the secondary pump beam.

At operation 616 a decision may be made as whether to approve the sample based on the thickness measurements of the system. For instance, the sample is intended to be manufactured to layers with certain thicknesses within certain tolerances. The acceptable tolerances or ranges may be predetermined. For example, a manufacturer of the sample may specify the tolerance or range of thicknesses for a component or layer of the sample. In some examples, the tolerances or ranges may be based on minimum or maximum thicknesses required for operability of the sample. If the thickness or thicknesses generated in operation 614 fall within the expected thicknesses and tolerances, the sample may be approved in operation 616. If the thickness or thicknesses generated in operation 614 do not fall within the expected thicknesses and tolerances, the sample may be rejected in operation 616. In some examples, a thickness may not be explicitly generated and the approval of the sample may be based on the analysis of the detected primary probe pulse and the secondary probe pulse. Additionally, in some examples, individual chips of the wafer may be analyzed with the methods disclosed herein, and the individual chips may be rejected or approved in operation 616 rather than an entire wafer.

If the sample is approved in operation 616, the method 600 flows to operation 618 where additional manufacturing steps are performed. In examples where the sample is a wafer, the additional manufacturing steps include operations such as back grinding the wafer. Manufacturing steps may also include cleaning and other finishing operations for the samples, including packaging operations. In some examples, the additional manufacturing steps may include additional testing such as electrical testing of semiconductor devices or chips on the wafer. For instance, electrical tests may be performed on each chip on the wafer to determine if the chips function properly or as expected. The chips may be virtually sorted into to virtual bins based on their test results. The chips that fail the test may be marked as bad or failed and be placed into a fail virtual bin for failed chips. Conversely, the chips that pass the test may be marked as good or passing and be placed into a pass virtual bin. Subsequent to testing, the wafer may be thinned and subsequently cut into individual chips. The chips that have been marked as passing the tests are packaged, such as into a memory card or storage device among other computer chip devices or applications. The percentage of chips that are approved from testing may generally be referred to as the yield. Once the chips have been packaged, they may be further tested to help ensure that the bonds from the chip to the remainder of the package or device have been properly formed and performance is still within acceptable limits. The packaged devices that are approved may then be further incorporated into a computing device. For example, where the chips of the wafer are packaged into a storage device, the storage device may be installed or incorporated into a computing device, such as a laptop or mobile phone.

If the sample is not approved in operation 616, the method 600 flows to operation 620 where the sample is rejected and may be discarded. The rejected sample may be salvageable or recyclable in some instances. By measuring or inspecting the samples prior to performing the additional manufacturing steps, such as back grinding and cleaning, the additional manufacturing steps are performed only on the samples that are acceptable or within tolerance. Accordingly, resources are not wasted on finishing samples that are unacceptable or outside of tolerances.

Figure 7:
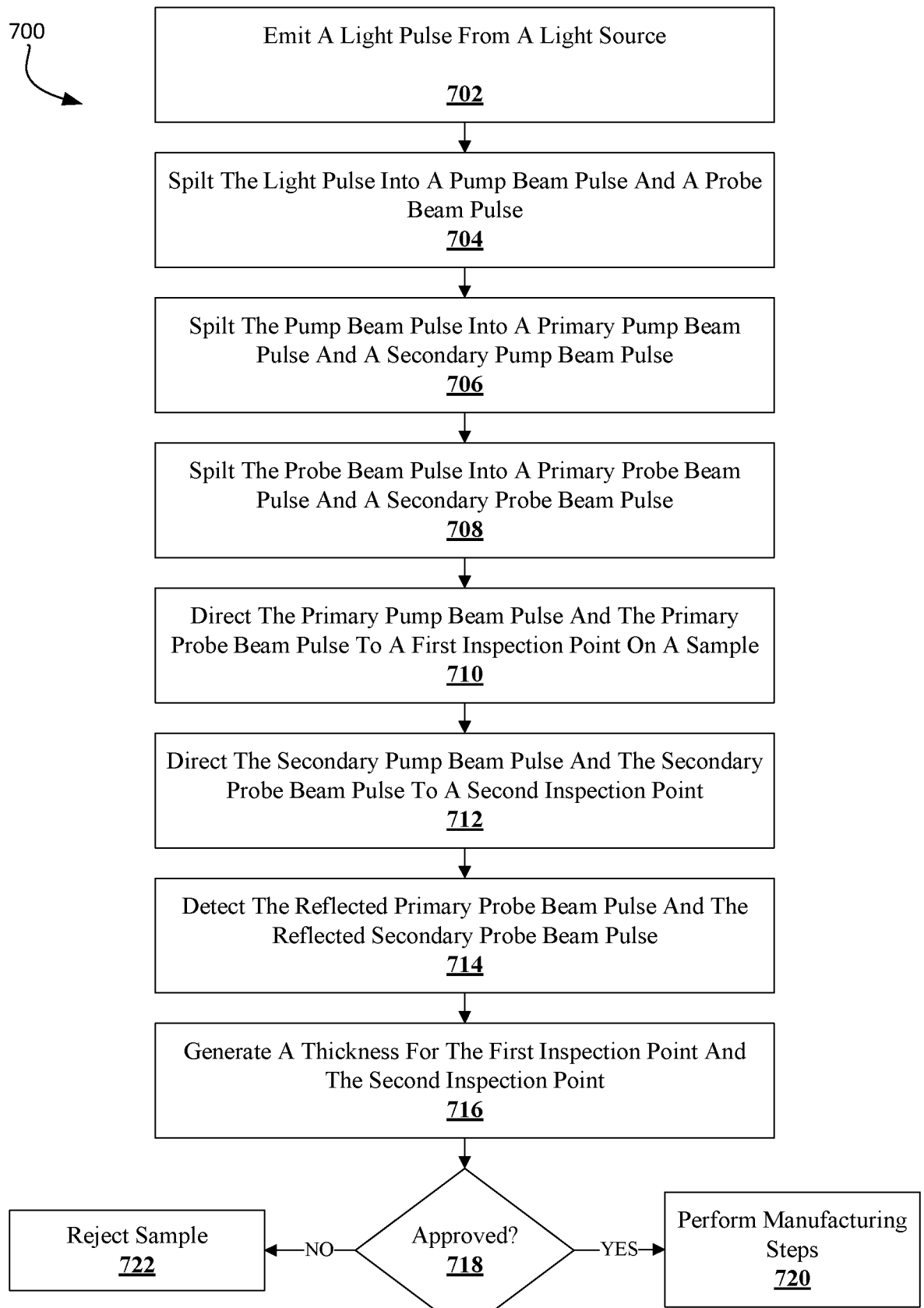
FIG. 7 depicts another example method for inspecting a sample.

FIG. 7 depicts another example method 700 for measuring or inspecting a sample. Method 700 allows for the measurement of two different measurement points with a single pulse of light emitted from a light source. At operation 702, a light pulse is emitted from a light source, such as a laser. At operation 604, the light pulse is split into a pump pulse and a probe pulse. The light pulse may be split by a beam splitter, such as a beam splitter discussed in FIGS. 1B, 2A-2B, and 3A-B. In some examples, the pump pulse and/or the probe pulse may be modulated. The pump pulse may be modulated by a first optical modulator and the probe pulse may be modulated by a second optical modulator. The probe beam may be modulated at a different frequency than the pump beam. In other examples, only the pump beam or the probe beam may be modulated.

At operation 706, the pump pulse is split into a primary pump pulse and secondary pump pulse. At operation 708, the probe pulse is split into a primary probe pulse and a secondary probe pulse. At operation 710, the primary pump pulse and the primary probe pulse are directed to a first measurement point on the sample. Directing the primary pump pulse and the primary probe pulse to the first measurement point may also include directing at least one of the primary pump pulse or the primary probe pulse through one or more optical fibers. At operation 712, the secondary pump pulse and the secondary probe pulse are directed to a second measurement point on the sample. Directing the secondary pump pulse and the secondary probe pulse to the first measurement point may also include directing at least one of the secondary pump pulse or the secondary probe pulse through one or more optical fibers.

The primary pump pulse may have a different polarization than the primary probe pulse when the primary pulses reach the first measurement point, and the secondary pump pulse may have a different polarization that the secondary probe beam when the secondary pulses reach in the second measurement point. In some examples, the primary pump pulse has a polarization that is different from a polarization of the secondary pump pulse, and the primary probe pulse has a polarization that is different from a polarization of the secondary probe pulse when the pulses reach the sample. In such examples, the primary probe pulse may have a polarization that is the same as the secondary pump pulse when the pulses reach the sample.

The timings of the respective pulses may be configured such that the primary pump pulse reaches the first measurement point prior to the primary probe pulse. Similarly, the secondary pump pulse may reach the second measurement point prior to the secondary probe pulse. Such timing may be achieved by having the beam path length of the primary pump pulse be shorter than the beam path length of the primary probe pulse. The beam path length of the secondary pump pulse is also shorter than the beam path length of the secondary probe pulse.

At operation 714, the primary probe pulse is detected after it has reflected from the first measurement point and the secondary probe pulse is detected after it has reflected from the second measurement point. The reflected primary probe pulse may be detected by a first detector and the reflected secondary probe pulse may be detected by a second detector. Detecting the primary and secondary probe pulses may also include generating one or more signals representing the reflected primary and secondary probe pulses. For example, the detector may convert the light in the probe pulses to electrical signals that can be processed and analyzed.

At operation 716, a thickness for the sample at the first measurement point is generated based on analyzing the detected primary probe pulse. For example, the signal representing the detected primary probe pulse may be analyzed to determine the effect of the acoustic wave, generated by the primary pump pulse, on the primary probe pulse. Based on the delay between the primary pump pulse and the primary probe pulse, a thickness of the sample at the first measurement point is determined and generated. The thickness generated may be for one or more layers within the sample at the first measurement point. Also at operation 716, a thickness for the sample at the second measurement point is generated based on analyzing the detected secondary probe pulse. For example, the signal representing the detected secondary probe pulse may be analyzed to determine the effect of the acoustic wave, generated by the secondary pump pulse, on the secondary probe pulse. Based on the delay between the secondary pump pulse and the secondary probe pulse, a thickness of the sample at the second measurement point is determined and generated. The thickness generated may be for one or more layers within the sample at the second measurement point.

At operation 718, a decision may be made as whether to approve the sample based on the thickness measurements of the system. For instance, the sample is intended to be manufactured to layers with certain thicknesses within certain predetermined tolerances. If the thickness or thicknesses generated in operation 716 fall within the expected thicknesses and tolerances, the sample may be approved in operation 718. If the thickness or thicknesses generated in operation 716 do not fall within the expected thicknesses and tolerances, the sample may be rejected in operation 718. In some examples, a thickness may not be explicitly generated and the approval of the sample may be based on the analysis of the detected primary probe pulse and the secondary probe pulse.

If the sample is approved in operation 718, the method 700 flows to operation 720 where additional manufacturing steps are performed. In examples where the sample is a wafer, the additional manufacturing steps included operations such as back grinding the wafer. Manufacturing steps may also include cleaning and other finishing operations for the samples, including packaging operations. If the sample is not approved in operation 718, the method 700 flows to operation 722 where the sample is rejected and may be discarded. The rejected sample may be salvageable or recyclable in some instances. By measuring or inspecting the samples prior to performing the additional manufacturing steps, such as back grinding and cleaning, the additional manufacturing steps are performed only on the samples that are acceptable or within tolerance. Accordingly, resources are not wasted on finishing samples that are unacceptable or outside of tolerances.

Figure 8:
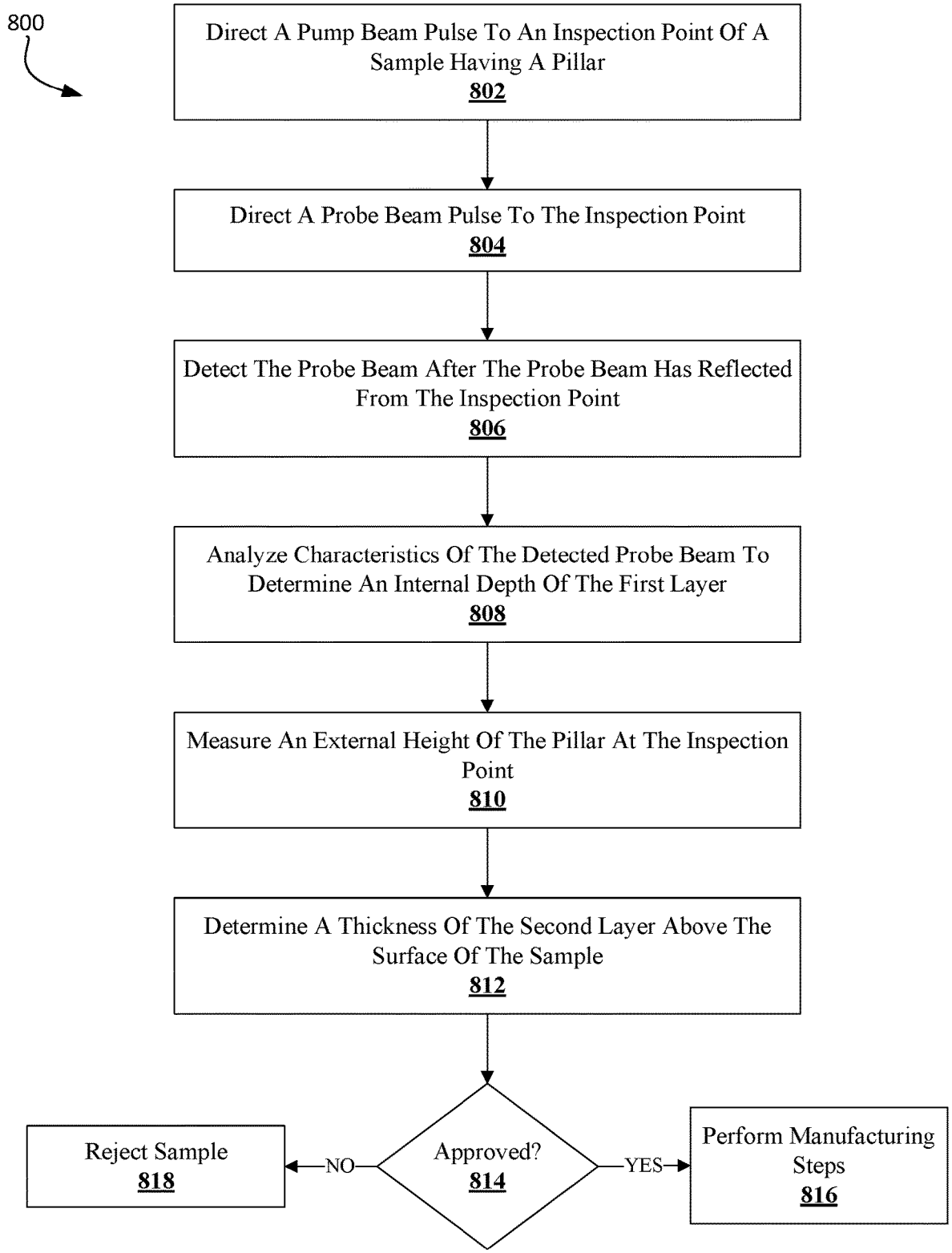
FIG. 8 depicts another example method for inspecting a sample having a pillar.

FIG. 8 depicts another example method 800 for measuring or inspecting a sample. More specifically, the example method 800 determined different depths for an measurement point having a pillar. At operation 802, a pump pulse is directed to an measurement point of a sample that includes a pillar protruding from a surface of the sample. The pillar may have a first layer made from a first material and a second layer made from a second material. For example, the first material may be a tin-silver (SnAg) and the second material may be copper (Cu) or nickel (Ni). At operation 804, a probe beam is directed to the measurement of the sample. At operation 806, the probe beam is detected after the probe beam has reflected from the measurement point on the sample. At operation 808, the characteristics of the detected probe beam are analyzed to determine an internal depth of the first layer.

At operation 810, an external height of the pillar at the measurement point is measured. The external height of the pillar may be measured in a variety of ways. For example, the external height of the pillar may be measured using an optical interferometry system, such as a scanning white light interferometer (SWLI) system. Confocal microscopy or other measurement systems may also be used. The measurement of the height of the pillar may also be performed using mechanical measurement systems or sonar measurement systems. Measuring the external height of the pillar may be performed by the same device that performs the internal depth measurement of the first layer. For instance, an optical interferometry system may be incorporated into one of the example metrology systems discussed above in FIGS. 1-5. In other examples, measuring the external height of the pillar may be performed by a different device than the one that performs the internal depth measurement of the first layer. For instance, the depth measurement of the first layer may occur before or after the measurement of the external pillar height. The sample may be passed between the two different devices for the two different measurements.

Various types of optical measurements systems may be utilized to determine the external height of the pillar. In such examples, measuring the external height of the pillar may include emitting a first electromagnetic wave pulse towards the surface of the sample. The first electromagnetic wave pulse is detected after it has reflected from the surface of the sample, and based on the time between emitting the first electromagnetic wave and the detecting the first electromagnetic wave, a first distance is determined. A second electromagnetic wave pulse may also be emitted towards the top of the pillar. The second electromagnetic wave pulse is detected after it has reflected from the top of the pillar, and based on the time between emitting the second electromagnetic wave and the detecting the second electromagnetic wave, a second distance to the top of the pillar is determined. Then, a difference between the first distance and the second distance may be determined, which results in the external height of the pillar above the surface of the sample.

Various types of acoustic measurements systems may also be utilized to determine the external height of the pillar. For example, a first pressure wave may be emitted towards the surface of the sample. The first pressure wave is detected after it has reflected from the surface of the sample, and based on the time between emitting the first pressure wave and the detecting the first pressure wave, a first distance is determined. A second pressure wave may also be emitted towards the top of the pillar. The second pressure wave is detected after it has reflected from the top of the pillar, and based on the time between emitting the second pressure wave and the detecting the second pressure wave, determining a second distance to the top of the pillar. Then, the difference between the first distance and the second distance may be determined, which results in the external height of the pillar above the surface.

At operation 812, a height of the second layer above the surface of the sample may be determined. The height of the second layer may be determined based on a difference between the measured height of the pillar and the depth of the first layer. For instance, the internal depth of the first layer may be subtracted from the external height of the pillar to determine the height of the second layer.

At operation 814, a decision may be made as whether to approve the sample based on the measurements made in performing method 800. For instance, the sample is intended to be manufactured with layers having certain thicknesses within certain predetermined tolerances. If the thickness or thicknesses generated during the performance of method 800 fall within the expected thicknesses and tolerances, the sample may be approved in operation 814. If the thickness or thicknesses generated during performance of method 800 do not fall within the expected thicknesses and tolerances, the sample may be rejected in operation 814. For example, if the internal depth of the first layer or the thickness of the second layer are required to be within predetermined tolerances, and the measurements indicate that the first layer and/or the second layer do not have characteristics falling within the tolerances, the sample may be rejected or at least the measured pillar may be rejected in operation 814.

If the sample is approved in operation 814, the method 800 flows to operation 816 where additional manufacturing steps are performed. In examples where the sample is a wafer, the additional manufacturing steps include operations such as back grinding the wafer. Manufacturing steps may also include cleaning and other finishing operations for the samples, including packaging operations. If the sample is not approved in operation 814, the method 800 flows to operation 818 where the sample is rejected and may be discarded. The rejected sample may be salvageable or recyclable in some instances. By measuring or inspecting the samples prior to performing the additional manufacturing steps, such as back grinding and cleaning, the additional manufacturing steps are performed only on the samples that are acceptable or within tolerance. Accordingly, resources are not wasted on finishing samples that are unacceptable or outside of tolerances. While the method 800 is described as being applied to a pillar, the method 800 may be used with any protruding structure having multiple layers of material.

As discussed above, in single laser opto-acoustic techniques, a mechanical delay stage is used to generate a delay between a series of laser pulses used for measurement. As there is a direct correlation between the linear extent of a delay stage and the depth to which measurements may be made in a sample, a longer delay stage is beneficial for measuring larger depths. But, as a delay stage works by forcing one set of pulses (probe pulses) to travel a greater distance than a second set of pulses (pump pulses), the speed of light imposes a size limitation on opto-mechanical delay stages. Longer delays may be directly proportional to the physical size of a delay stage and the physical form of metrology system can limit how large a delay that a delay stage can create. Physical constraints of measurement devices, however, often prevent the increases in the physical size of the delay stage. Aspects of the present technology may also provide for methods and systems that extend the capability of a delay stage without increasing the size of the delay stage.

Figure 9A:
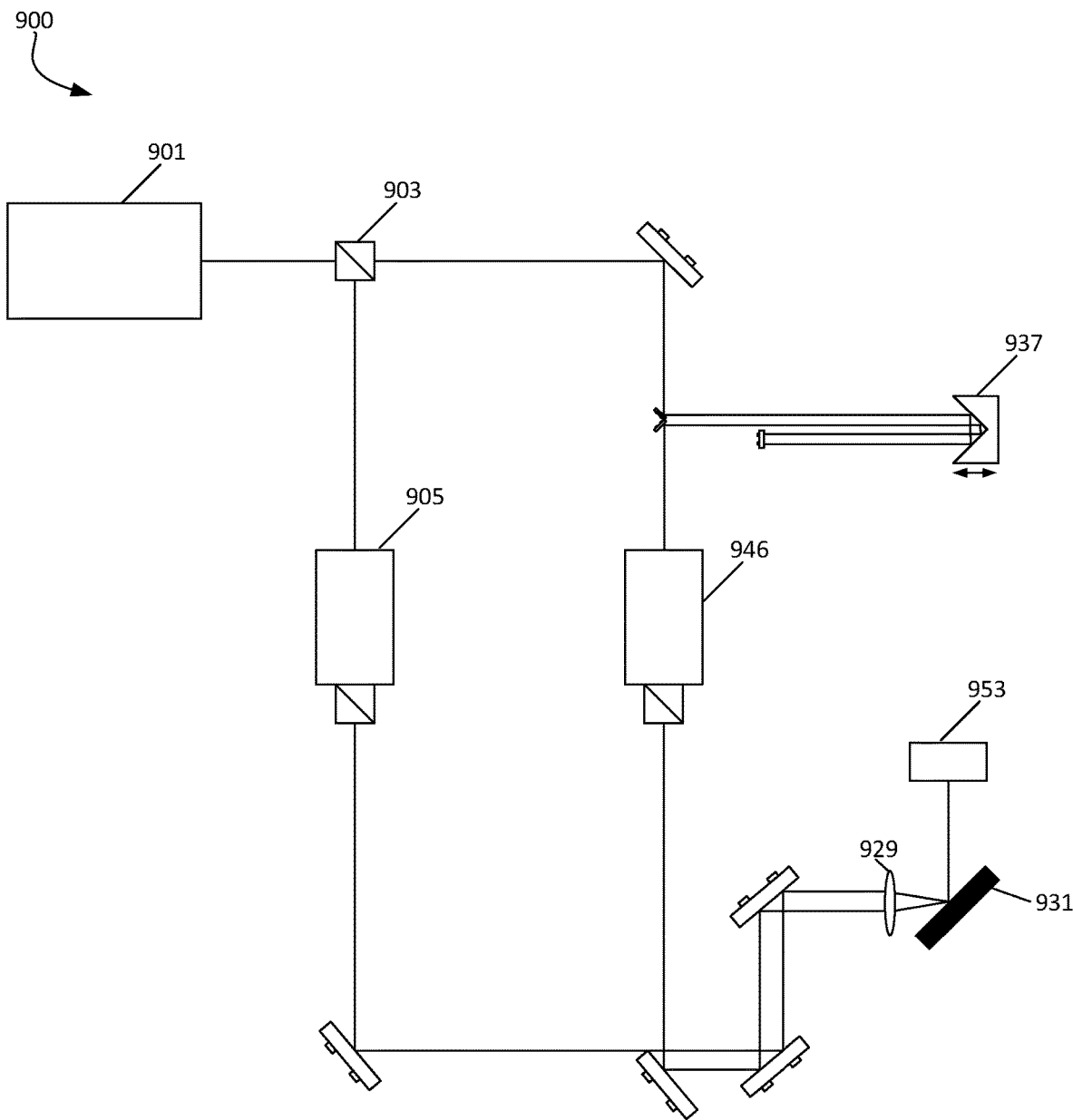
FIG. 9A is a schematic representation of an optoacoustic metrology system having a single sensor for measuring pump and probe pulse intensities.

FIG. 9A illustrates an example opto-acoustic opaque film thickness metrology system 900. The system 900 is presented in a simplified form, and the system 900 shares several components of the systems described above. As such, only a cursory description of the physical aspects of the system 900 will be provided here. Opto-acoustic system 900 includes a laser 90 that outputs short pulses of light, which may be emitted at a rate of about 60 MHz. The emitted pulses are split into two beams by beam splitter 903. A first beam is directed through an electro optic modulator (EOM) 905. This first beam of pulses, also referred to as 'pump' pulses, is directed to focusing optics 929, which direct the pump pulses onto the surface of a sample 931. The sample 931 may include a substrate having a thin, opaque film formed thereon.

Splitter 903 directs a second beam of pulses, referred to as the 'probe' pulses, through a delay stage 937 and another EOM 946 before directing the probe pulses through focusing optics 929 onto the surface of the substrate 931. Pump and probe pulses may be substantially coincident with one another on the surface of the sample 931.

FIG. 9A illustrates the use of turning mirrors to form the optical path of the pump and probe beams. Other means, such as optical fiber, can be used to define the optical path, other than in the delay stage, from the laser 901 to the sample 931. Note also, that the optical system shown in FIG. 9 is simplified and omits, for the purposes of clarity, certain aspects of the optical system such as various optical elements, lens, filters, apertures and the like.

Figure 9B:
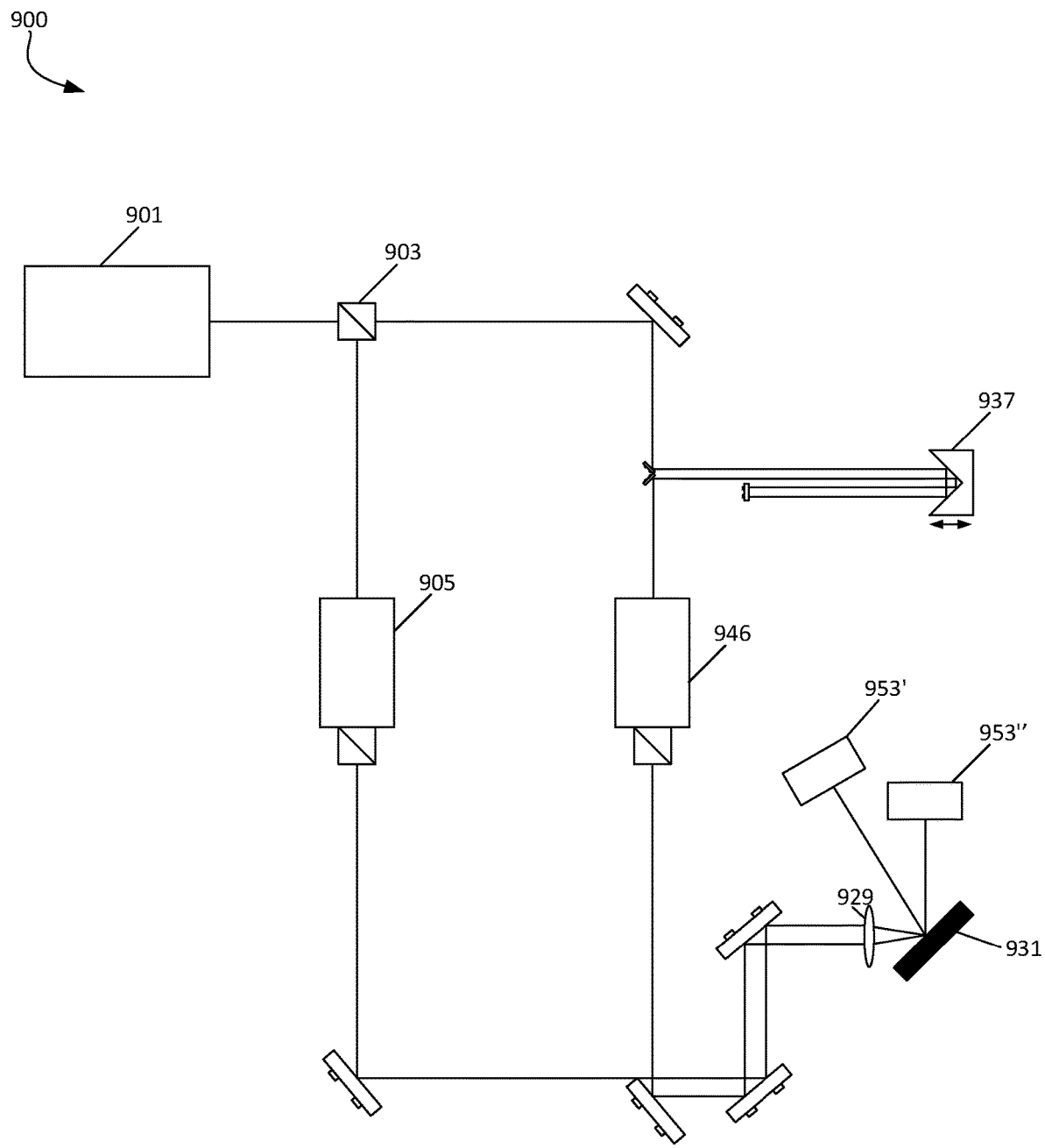
FIG. 9B is a schematic representation of an optoacoustic metrology system having two sensors for measuring pump and probe pulse intensities.

FIG. 9B illustrates another embodiment of the system 900 shown in FIG. 9A in which two entirely independent sensors 953' and 953" are used in lieu of a single sensor 953. As will be appreciated, a single sensor 953 as shown in FIG. 9A can be arranged to measure, independently and simultaneously, the intensity of both pump and probe pulses that originate from laser 901. FIG. 9B illustrates that sensors 953' and 953" can be arranged independent of one another.

One difference between pre-existing optical systems arranged to carry out opto-acoustic thin film measurements and the system 900 of the present technology is that in the present system 900, both pump and probe beams, when returned from the surface of the sample 931, are incident upon one or more sensors, schematically shown as sensor 953. Sensor 953 may include one or more sensors for measuring the intensity of the pump and probe beams and/or the deflection of the pump and probe beams. Sensor 953 may include one or more position sensitive detectors (PSD) associated with each of the pump and probe beams.

Figure 10A:
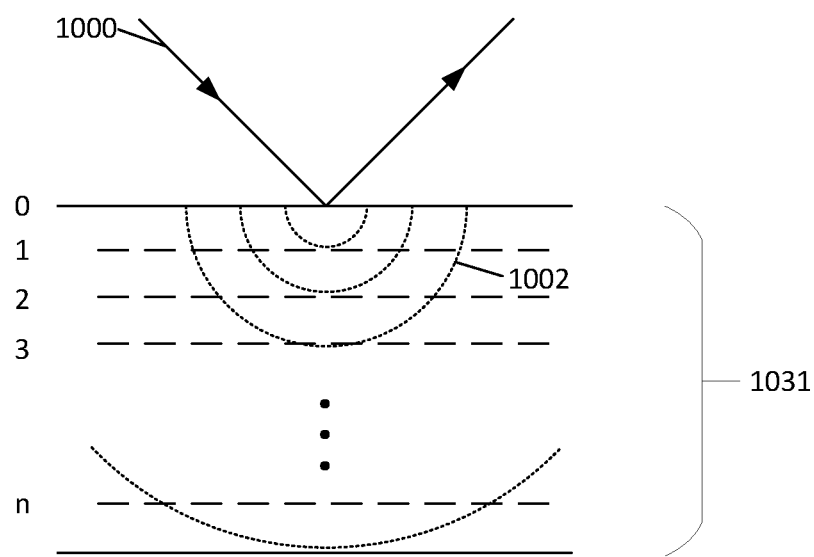
FIG. 10A is a schematic that relates the various delay stage settings illustrated in FIG. 2a to measurement depths in sample.

As discussed above, opto-acoustic thin film measurements start by inducing an acoustic wave in a sample 931 using the pump beam pulses derived from laser 12. In FIG. 10A, a laser pulse 1000 is incident upon the surface of the sample 1031. A laser pulse that induces an acoustic wave is referred to as the pump pulse. The acoustic waves (dashed lines 1002) move through the sample 1031 and interact with structures within the sample 1031. Where an acoustic wave 1002 intersects an object or structure within the sample 1031, a portion of the acoustic wave will be reflected back towards the surface of the sample 1031. A second laser pulse 1000 will be subsequently directed to the sample 1031 at a time delay that is correlated with a specific distance below the surface of the sample 1031. Where the second laser pulse 1000 is incident upon the surface of the sample 1031 at the same time that a reflected acoustic wave 1002 reaches the surface, the second laser pulse 1000 will be modified by changes in the surface of the sample. These changes may include a change in the intensity of the second laser pulse 1000 that is reflected from the sample 1031 to the sensor or a deflection in the position of the reflected laser pulse 100 this is incident upon the sensor.

Time delays are generated between pump and probe pulses of laser light using an opto-mechanical delay stage 937 in which light is caused to travel different distances. In operation, a single laser pulse from laser 901 is split by splitter 903. The resulting discrete laser pulses essentially remain in sync even though they are not travelling along different branches of the system 900 optical path. Provided that the optical paths are the same length, the discrete pulses will be incident upon the sample 931 at the same time. Where the delay stage 937 lengthens the optical path of the laser pulse that passes therethrough, the extra time required for the laser pulse to move through the delay stage 937 will create a delay between the pump and probe pulses.

Figure 10B:
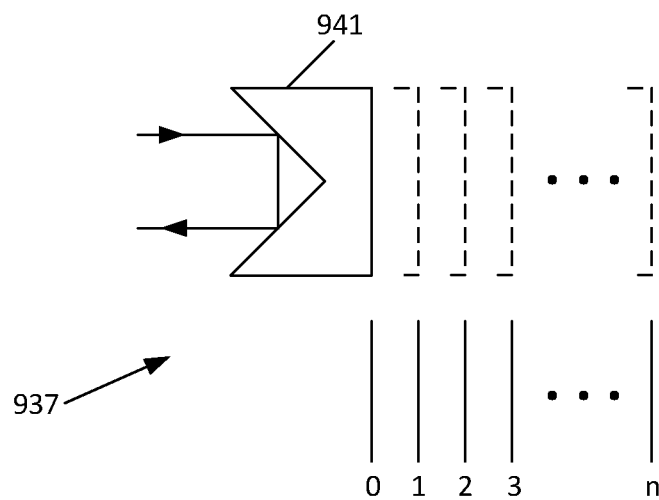
FIG. 10B is a diagram illustrating various delay stage settings.

The delay stage 937 positions shown in FIG. 10B may be correlated with the depth at which measurements are made in the sample 931. The '0' position of the delay stage 937 can be correlated with examining the sample 931 for structures such as film interfaces at position '0' as seen in FIG. 10A. Lengthening the delay stage 937 path length, e.g. moving the retroreflector 9411 between positions 0, 1, 2, 3, . . . , n as seen in FIG. 10B, allows the sensor 953 to identify structures at position 0, 1, 2, 3, . . . , n as shown in FIG. 10A. This is possible as the longer delay stage positions allow for more time for an acoustic wave 1002 to travel down into the sample 931 and return to the surface.

One challenge associated with the use of opto-mechanical delay stages is that one may require an exceedingly long delay stage to obtain measurements deeper in the sample 931. This is simply because the speed of a laser pulse moving through the delay stage is much greater than the speed at which an acoustic wave 1002 moves through the sample 931. Light moves at ~3×10^8 m/s whereas acoustic waves move through a sample at around 5000 m/s.

Figure 11:
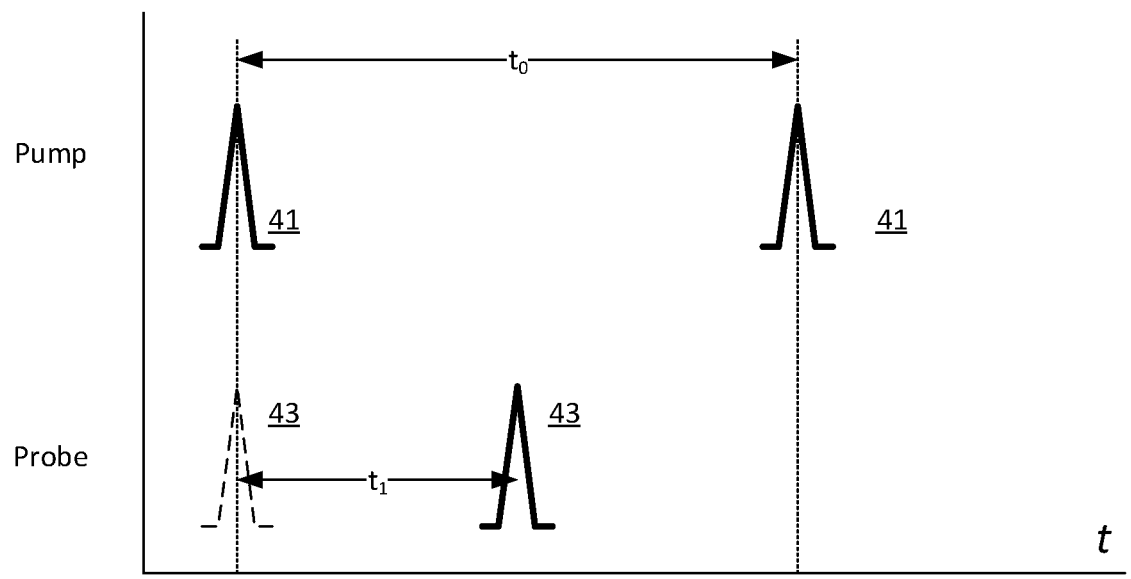
FIG. 11 illustrates a standard timing sequence for opto-acoustic pump/probe pulses.

FIG. 11 shows how delays between pump and probe pulses can be controlled using only the delay stage 937 to modify the probe beam delay. The pump pulse 41 in FIG. 11 travels through EOM 905 and the probe pulse 43 passes through delay stage 937. Modification of optical path length using the delay stage 937 can control the time, t1, between the incidence of the pump pulse 41 and the probe pulse 43 from simultaneity to an arbitrary delay limited by the adjustability of the delay stage 937. With reference to FIGS. 10A and 10B, at delay stage position '0', the pump and probe pulses are incident on the sample at close to simultaneity and at delay stage position 'n', the pump and probe pulses have reached their maximum separation. The time delay between the incidence of the probe pulse and the subsequent pump pulse is essentially not used due to limitations on the standard method of operation an opto-acoustic measurement system.

One benefit of the using an optical arrangement such as the one used by system 900 is that the pump and probe pulses may be interchangeable. Both pulses are, after all, derived from the same laser 1000. For our purposes, the significant difference between the pulses that follow either branch of the optical paths through system 900 is that the delay stage 937 adds length to the optical path of pulses passing through the EOM 946. From a practical point of view, it matters not which beam is used for probe and pump as either will suffice.

Sensor 953 measures the intensity and/or deflection of both sets of laser pulses and as a result either can be used as probe or pump beam. This has the benefit of allowing the 'lost' time mentioned in the foregoing paragraph to be added to the delay t1. By switching between pump and probe laser pulses as needed, one can achieve a longer delay between pump and probe and accordingly, structures located deeper within a sample 931 may be assessed. Note that sensor 953 may be split based on polarization to ensure that there is little, if any, cross talk between pump and probe pulses that are incident upon the sensor 931.

In one example, a series of laser pulses are incident upon a sample 931 at a substantially constant frequency. This frequency can vary and is selected so that the period between pulses will allow for measurement at a desired depth within the sample 931. Returning to FIGS. 11-12, the period between each pump pulse is denoted by arrow t0. The delay stage 937 is manipulated to create a delay t1 represented. The delay t1 is a function of the length of the delay stage 937 optical path. Measurement of all structures (e.g. layer/film interfaces or voids) within a shallow portion of the sample 931 are carried out. Thereafter, the pump and probe beams are nominally switched and measurements of all structures within a deeper portion of the sample 931 are carried out. Note that 'switching' is not a physical process and that at a minimum this means that data from the sensor 953 is obtained 'with respect to' a particular probe/pump arrangement.

Figure 12:
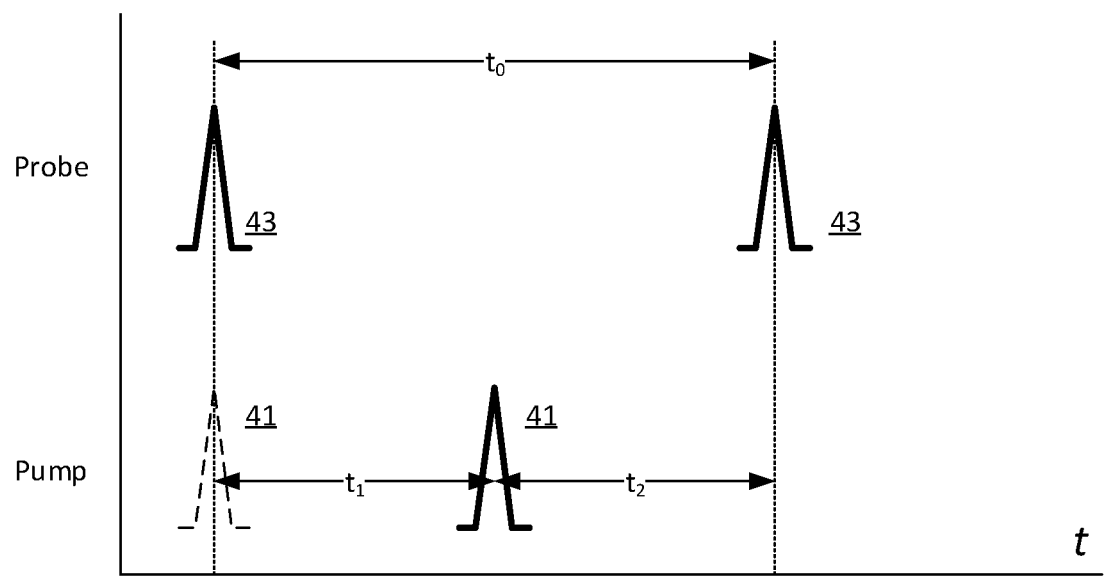
FIG. 12 illustrates a timing sequence for opto-acoustic pump/probe pulses according to an embodiment of the present invention.

In another embodiment, such as that shown in FIG. 9B, two separate sensors 953' and 953" are provided to allow for measurement of both probe and pump beams simultaneously. In this embodiment, sensors 953' and 953" generate a continuous stream of data that can be assessed as shown in FIG. 11 or as shown in FIG. 12.

The concepts of 'shallow' and 'deeper' are related to the extent to which the delay stage can be modified to extend or shorten the delay between pump and probe pulses where the probe pulses travel through the delay stage and where they do not. Where the probe pulses travel through the delay stage 937, the delay between pump and probe pulses is limited to a depth that is function of the length of the delay stage 937 and the speed of sound of acoustic waves in the sample 931. Shallow means that the delay is relatively shorter and limited by the extension of the delay stage 937 whereas deeper means that the delay also includes the portion of the laser 901 period t2 that is not addressable by the adjustment of the delay stage 937. Note that where pump pulses are provided at a relatively low frequency, time periods t1 and t2 may not add up to the amount of time to. Where the total delay t1 that can be achieved by delay stage 937 is greater than or at about half of the period t0 of the laser 901, all or most of the period of the laser 901 can be used to extend the delay. Careful selection of laser 901 frequencies and control of delay stage length can provide a significantly longer delay and allow measurement of deeper structures with very little modification to the system 900. The depth of measurement of the system 900 may not extend beyond the position that corresponds to the maximum delay. Moving beyond this maximum is possible, but requires that selected probe and/or pump pulses be ignored or prevented from reaching the sample 931.

FIG. 13 depicts an example method 1300 for controlling an opto-acoustic metrology system. At operation 1302, a pump laser pulse is directed to a surface of the sample. The pump laser pulse travels along a first optical path and may pass through a delay stage prior to reaching the surface of the sample. In some examples, the pump laser pulse may include a series of laser pulses that are directed to the surface of the sample at a fixed rate or period. At operation 1304, a probe laser pulse is directed to the surface of the sample through a second optical path, which may include a variable delay stage. The probe laser pulse may include a series of laser pulses that are directed to the surface of the sample at a fixed rate. At operation 1306, the length of the delay stage is modified, which allows for the measurements of at least one characteristics of the sample to be measured at particular or selected depths or depth ranges. Modification of the delay stage provides for either the pump pulse or the probe pulse to be directed to the surface of sample at a variable rate or a variable delay period with respect to other pulse. For example, where the probe pulse may be variably delayed to create a variable delay period with respect to the pump laser pulses.

At operation 1308, the intensity and/or deflection of the probe beam and/or the pump beam is measured. For instance, in some examples, the intensity and the deflection of both the probe beam and the pump beam are measured. Measuring may include using at least one of a first and a second optical sensor positioned to receive a first and a second laser pulse. The measurement may also include a measurement or determination of how long it takes for an opto-acoustic wave launched by one of the first and second laser pulse to return to the surface of the sample. Measuring may be conducted at a range of delays, where each of the delays is correlated with a vertical position within the sample. Based on the measurements made in operation 1308, at least one characteristic for the sample is determined in operation 1310. For example, the thickness of a feature may be determined, such as the thickness of a thin, opaque film on the sample.

Figure 14A:
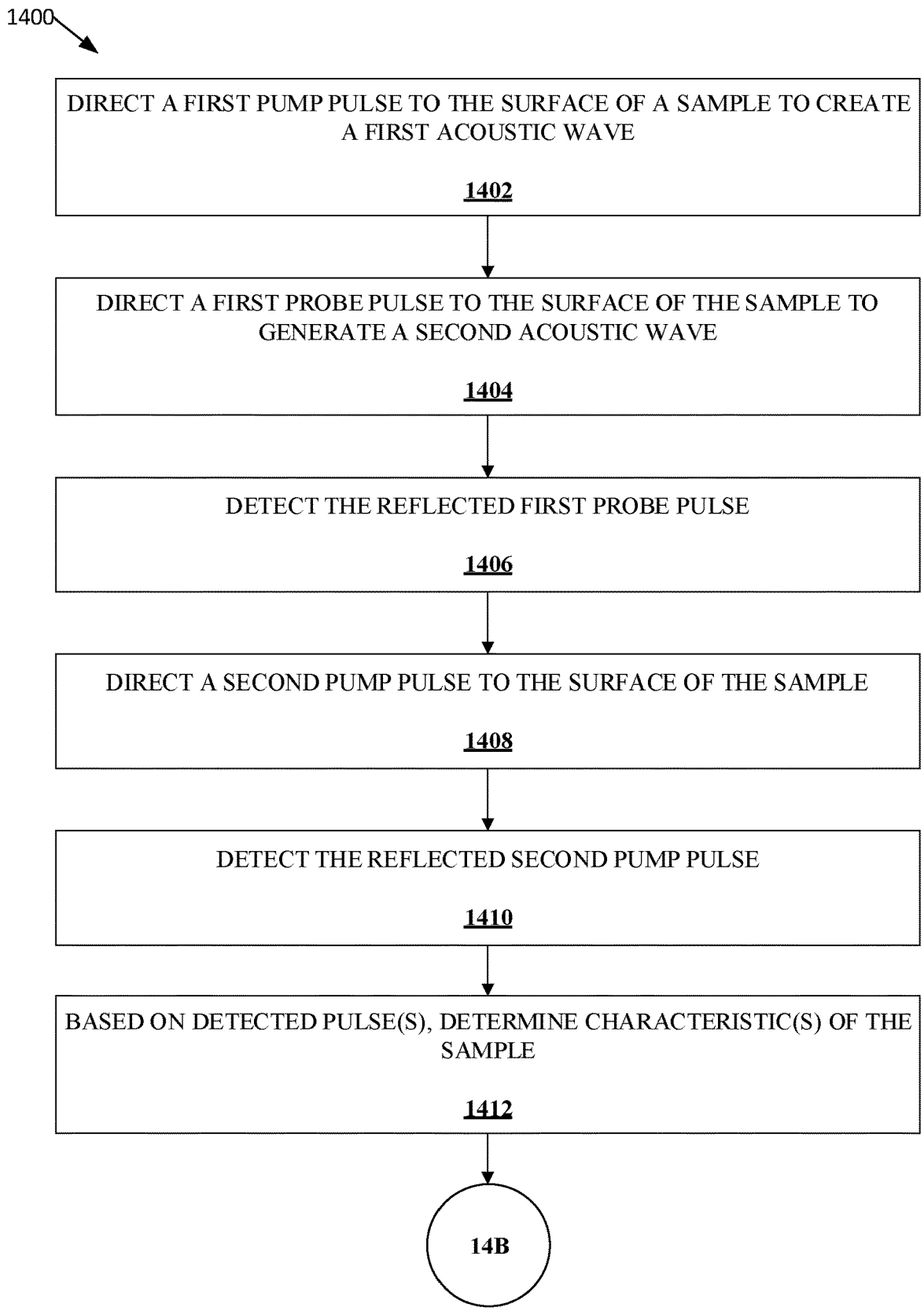
FIGS. 14A-B depict an example method for characterizing a sample through opto-acoustic metrology.
Figure 14B:
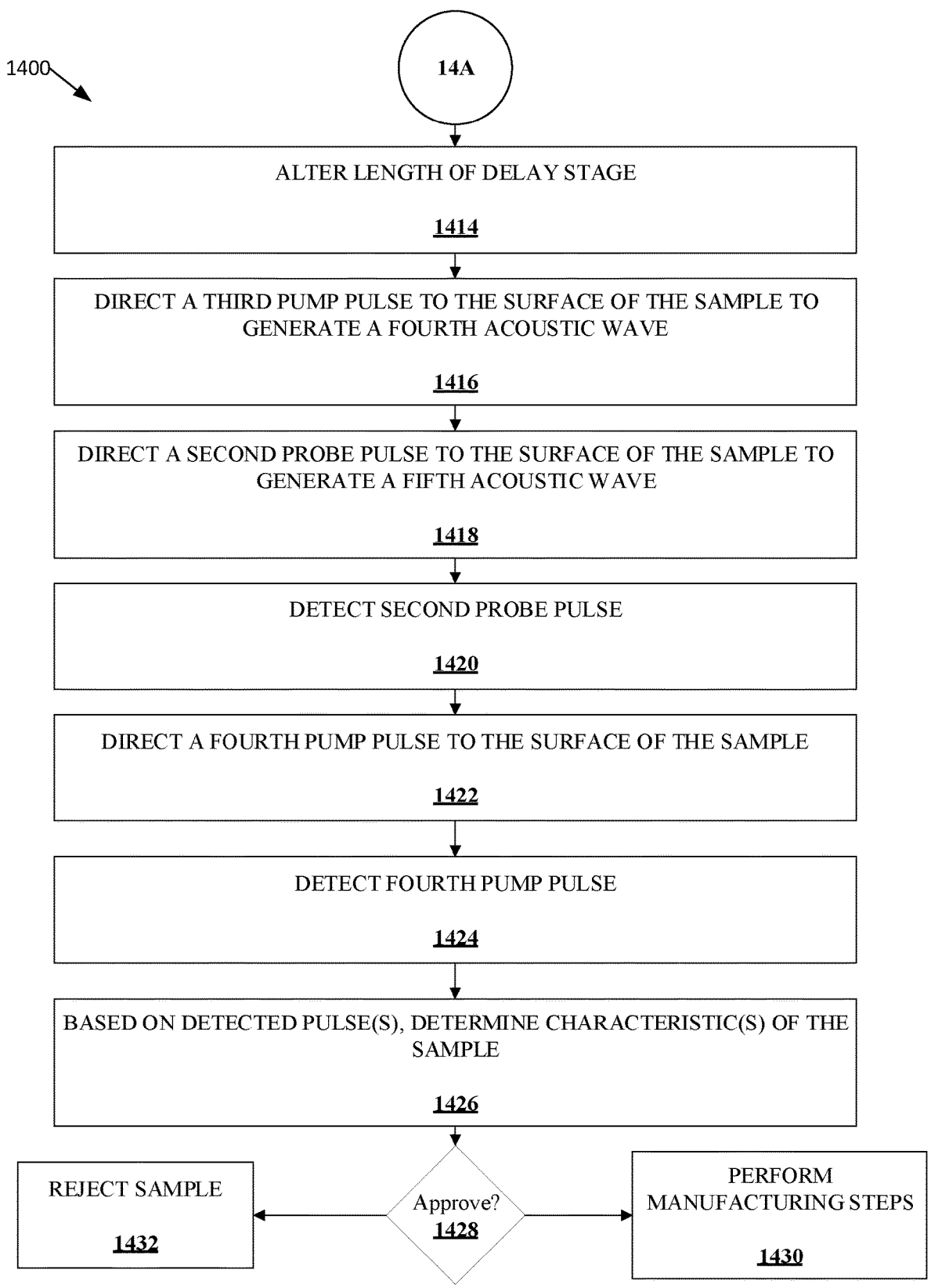

FIGS. 14A-B depict an example method 400 for characterizing a sample through opto-acoustic metrology. In particular, the method 400 interchanges or switches functionality associated with a pump beam and a probe beam. At operation 1402, a first pump pulse from a pump beam is directed to the surface of the sample. The first pump pulse generates a first acoustic wave in the sample. At operation 1404, a first probe pulse from a probe beam is directed to the surface of the sample such that the first probe pulse reaches the surface of the sample at a first duration of time after the first pump pulse reaches the surface of the sample. As discussed herein, the first duration of time may be controlled or altered by changing the length of a delay stage. The first duration of time, however, is limited by the length of the delay stage. Accordingly, the maximum duration for the first duration of time may be based on the maximum length of the delay stage. The first probe pulse generates a second acoustic wave in the sample. The first probe pulse may also be affected by the first acoustic wave when it reflects off the sample. At operation 1406, the reflected first probe pulse may be detected by a detector.

At operation 1408, a second pump pulse is directed to the surface of the sample such that the second pump pulse reaches the surface of the sample at a second duration of time after the first probe pulse reaches the surface of the sample. As discussed herein, such as with reference to FIGS. 11-12 above, the second duration of time (e.g., the time between the first probe pulse and the second pump pulse) is based at least in part on the pulse rate of the laser generating the pulses. For example, the second duration of time may be equivalent to the difference between the pulse rate of the laser (e.g., the period between pulses) and the first duration of time (e.g., the time between the first pump pulse and the first probe pulse). Accordingly, the second duration of time may be substantially longer than the first duration of time, which allows for measurements at depths of the sample that were previously unavailable. When the second pump pulse reflects from the surface of the sample, the second pump pulse is affected by the second acoustic wave. The second pump pulse also generates a third acoustic wave in the sample. At operation 1410, the reflected second pump pulse is detected by a detector. To distinguish the second pump pulse from the first probe pulse, a first detector may be used to detect the first probe pulse and a second detector may be used to detect the second pump pulse. Alternatively, or additionally, the first probe pulse may have a first polarization or first modulation and the second pump pulse may have a second polarization or second modulation such that the first probe pulse may be distinguished from the second pump pulse. In such an example, the first probe pulse and the second pump pulse may be detected by the same detector.

At operation 1412, one or more characteristics of the sample are determined based on the detected pulse(s). For example, a first characteristic of the sample may be determined based on the reflected second pump pulse detected in operation 1410. The first characteristic of the sample may be for a first depth in the sample. The first depth of the sample corresponds to the second duration of time. A second characteristic may also be determined based on the reflected first probe pulse detected in operation 1406. The second characteristic may be for a second depth in the sample. For example, the first characteristic may be a thickness of a first feature or layer of the sample, and the second characteristic may be a thickness of the second feature or layer of the sample. In examples where the first duration of time (e.g., the time between the first pump pulse and the first probe pulse) is less than the second duration of time (e.g., the time between the first probe pulse and the second pump pulse), the second depth is less than the first depth. Accordingly, in contrast to prior systems, characteristics of the sample may be determined based on a detected probe pulse and/or a detected pump pulse.

The method 1400 may continue to operation 1414 where the length of the delay stage is altered. Altering the length of the delay stage causes the time between the pump and probe pulses to be altered. Subsequent to altering the length of the delay stage, at operation 1416, a third pump pulse is directed towards the surface of the sample to generate another acoustic wave in the sample (e.g., a fourth acoustic wave). A second probe pulse is then directed to the surface of the sample at operation 1418. The second probe pulse reaches the surface of the sample a third duration of time after the preceding third pump pulse. The third duration of time may be longer or shorter than the first duration depending on whether the delay stage was lengthened or shortened in operation 1414. If the delay stage was lengthened, the third duration is longer than the first duration. If the delay stage was shortened, the third duration is shorter than the first duration. When the second probe pulse reflects from the surface of the sample, the second pulse is affected by the fourth acoustic wave. The second probe pulse may also generate another acoustic wave in the sample (e.g., a fifth acoustic wave). The reflected second probe pulse may then be detected in operation 1420.

At operation 1422 a fourth pump pulse is directed to the surface of the sample. The fourth pump pulse reaches the surface of the sample at a fourth duration of time after the second probe pulse reaches the surface of the sample. The fourth duration of time may be based on the pulse rate of the laser that generates the pulses and the length of the delay stage after alteration in operation 1414. For example, if the delay stage was lengthened in operation 1414 and the pulse rate of the laser remains constant, the fourth duration of time may be less than the second duration of time (e.g., the time between the first probe pulse and the second pump pulse). When the fourth pump pulse reflects from the surface of the sample, the fourth pump pulse is affected by the acoustic wave generated by the second probe pulse (e.g., the fifth acoustic wave). At operation 1424, the reflected fourth pump pulse is detected by a detector.

At operation 1426, based on the detected pulse(s), additional characteristics of the sample may be determined. The characteristics may be thicknesses of features or layers of the sample. For example, a third characteristic, corresponding to a third depth, may be determined based on the detected second probe pulse. A fourth characteristic, corresponding to a fourth depth, may be determined based on the detected fourth pump pulse. The third depth may be less than or greater than the second depth depending on whether the delay stage was lengthened or shortened in operation 1414. Similarly, the fourth depth may be less than or greater than the first depth depending on whether the delay stage was lengthened or shortened in operation 1414 and whether the pulse rate of laser remained constant or changed.

At operation 1428 a decision may be made as whether to approve the sample based on the determined or measured characteristics at operation 1426 and/or operation 1412. For instance, the sample is intended to be manufactured to layers with certain thicknesses within certain tolerances. The acceptable tolerances or ranges may be predetermined. For example, a manufacturer of the sample may specify the tolerance or range of thicknesses for a component or layer of the sample. In some examples, the tolerances or ranges may be based on minimum or maximum thicknesses required for operability of the sample. If the characteristics determined in operation 1426 and/or operation 1412 fall within the expected thicknesses and tolerances, the sample may be approved in operation 1428. If the characteristics determined in operation 1426 and/or operation 1412 do not fall within the expected thicknesses and tolerances, the sample may be rejected in operation 1428.

If the sample is approved in operation 1428, the method 1400 flows to operation 1430 where additional manufacturing steps are performed. In examples where the sample is a wafer, the additional manufacturing steps include operations such as back grinding the wafer. Manufacturing steps may also include cleaning and other finishing operations for the samples, including packaging operations. In some examples, the additional manufacturing steps may include additional testing such as electrical testing of semiconductor devices or chips on the wafer. For instance, electrical tests may be performed on each chip on the wafer to determine if the chips function properly or as expected. The chips may be virtually sorted into to virtual bins based on their test results. The chips that fail the test may be marked as bad or failed and be placed into a fail virtual bin for failed chips. Conversely, the chips that pass the test may be marked as good or passing and be placed into a pass virtual bin. Subsequent to testing, the wafer may be thinned and then cut into individual chips. The chips that have been marked as passing the tests are packaged, such as into a memory card or storage device among other computer chip devices or applications. The percentage of chips that are approved from testing may generally be referred to as the yield. Once the chips have been packaged, they may be further tested to help ensure that the bonds from the chip to the remainder of the package or device have been properly formed and performance is still within acceptable limits. The packaged devices that are approved may then be further incorporated into a computing device. For example, where the chips of the wafer are packaged into a storage device, the storage device may be installed or incorporated into a computing device, such as a laptop or mobile phone.

If the sample is not approved in operation 1428, the method 1400 flows to operation 1432, where the sample is rejected and may be discarded. The rejected sample may be salvageable or recyclable in some instances. By measuring or inspecting the samples prior to performing the additional manufacturing steps, such as back grinding and cleaning, the additional manufacturing steps are performed only on the samples that are acceptable or within tolerance. Accordingly, resources are not wasted on finishing samples that are unacceptable or outside of tolerances.

Figure 15:
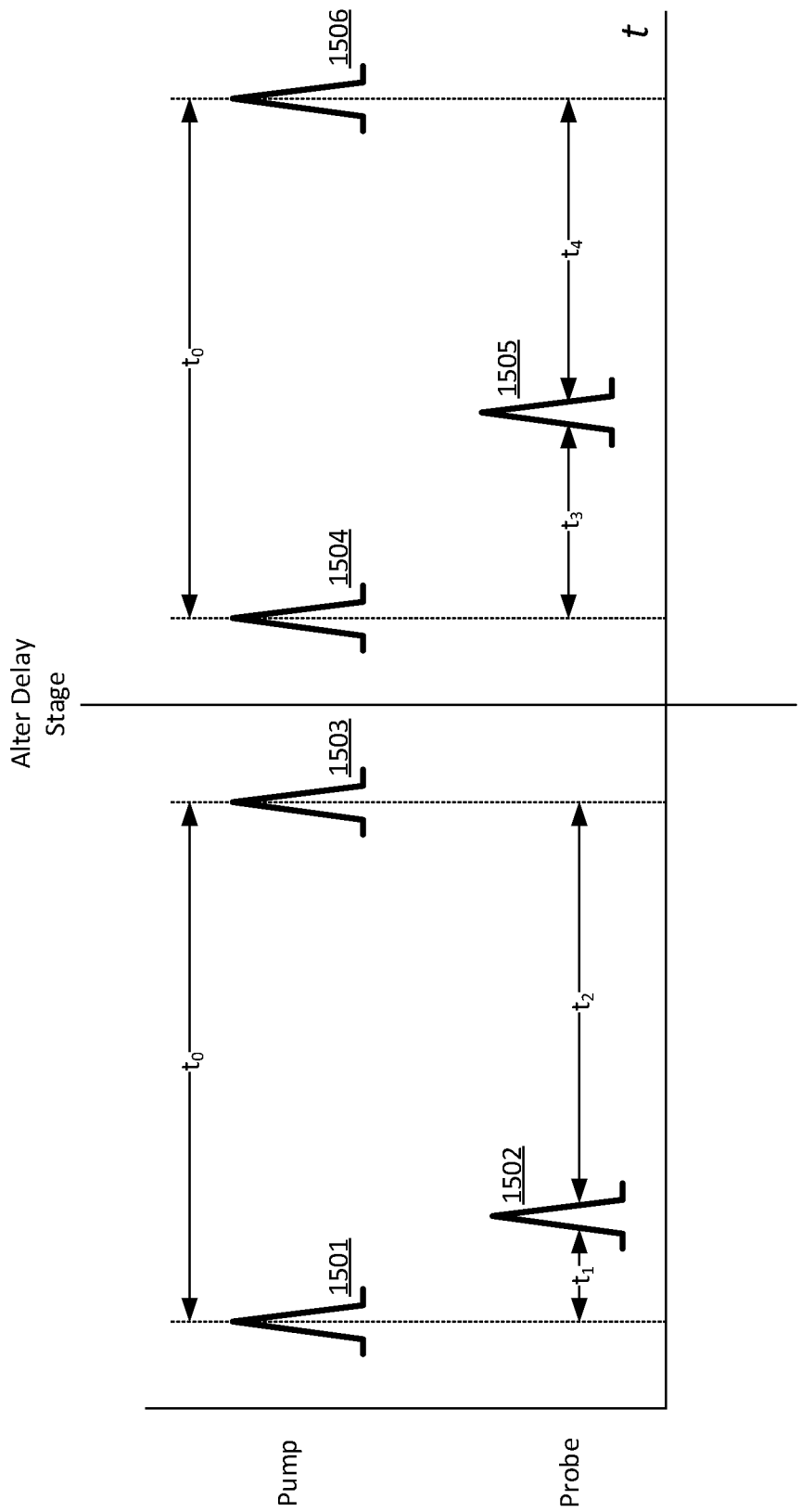
FIG. 15 depicts a pulse pattern according to the example method depicted in FIGS. 14A-B.

FIG. 15 depicts a pulse pattern according to the example method 400 depicted in FIGS. 14A-B and described above. A first pump pulse 1501 is first directed to the surface of the sample. A first probe pulse 1502 is then generated at first duration of time ($t_1$) after the first pump pulse 1501. A second pump pulse 1503 is generated and directed to the surface of the sample based on the pulse rate of the laser. The period between laser pulses is represented by time duration (to). The second pump pulse 1503 is directed to the surface of the sample a second time duration (t2) after the first probe pulse 1501.

At some point subsequent to the second pump pulse 1503 being directed to the surface of the sample, the delay stage is altered. In the example pulse pattern depicted, the delay stage is lengthened, which increases the path length for the probe pulses. Subsequent to the delay stage being lengthened, a third pump pulse 1504 is directed to the surface of the sample. A second probe pulse 1505 is then directed to the surface of the sample at a third time duration ($t_3$) after the third pump pulse 1504. In the example depicted, the third time duration ($t_3$) is greater than the first time duration ($t_1$) because the delay stage was lengthened. A fourth pump pulse 1506 is generated and directed at the surface of the sample based on the pulse rate of the laser, which has remained constant in the present example. Accordingly, the fourth pump pulse 1506 is generated at a time duration ($t_0$), corresponding to the period between pulses for the laser, after the third pump pulse 1504. The generation of the fourth pump pulse 1506 occurs a fourth time duration ($t_4$) after the second probe pulse 1505. Due to the increase in length of the delay stage, the fourth time duration ($t_4$) is shorter than the second time duration ($t_2$).

As should be appreciated from the foregoing, the pump beam and probe beam may be interchangeable with one another to allow for greater depth measurements without having to physically alter the size of opto-acoustic measurement device. For instance, the initial splitting of the laser beam results in two laser pulses that reach the surface of the sample. While traditionally one of these pulses has been considered the "pump" pulse and the other pulse has been considered the "probe" pulse, both pulses are capable of being analyzed and generating acoustic waves within the bulk of the sample. Accordingly, as both pulses are detected and analyzed, the effect of the acoustic waves generated by either of the pulses may be analyzed and used to determine characteristics of the sample. Such an analysis allows for determining characteristics at depth ranges that are greater than those corresponding solely due to the delay between the pump pulse and probe pulse. In some examples, measurements of the first and second laser pulses may be taken in a substantially continuous manner, such that a series of both pulses are detected and recorded. During the emission of the series of pulses, the delay between the first pulse and the second pulse may be varied (e.g., by lengthening or shortening the delay stage) to provide a variety of detected data for analysis. Through lock-in detection techniques, the first pulses may be identified or distinguished from the second pulses. The data may then be analyzed to determine the effect of acoustic waves generated from any prior pulses on the particular pulse being analyzed.

The embodiments described herein may be employed using software, hardware, or a combination of software and hardware to implement and perform the systems and methods disclosed herein. Although specific devices have been recited throughout the disclosure as performing specific functions, one of skill in the art will appreciate that these devices are provided for illustrative purposes, and other devices may be employed to perform the functionality disclosed herein without departing from the scope of the disclosure. In addition, some aspects of the present disclosure are described above with reference to block diagrams and/or operational illustrations of systems and methods according to aspects of this disclosure. The functions, operations, and/or acts noted in the blocks may occur out of the order that is shown in any respective flowchart. For example, two blocks shown in succession may in fact be executrix or performed substantially concurrently or in reverse order, depending on the functionality and implementation involved.

This disclosure describes some embodiments of the present technology with reference to the accompanying drawings, in which only some of the possible embodiments were shown. Other aspects may, however, be embodied in many different forms and should not be construed as limited to the embodiments set forth herein. Rather, these embodiments were provided so that this disclosure was thorough and complete and fully conveyed the scope of the possible embodiments to those skilled in the art. Further, as used herein and in the claims, the phrase "at least one of element A, element B, or element C" is intended to convey any of: element A, element B, element C, elements A and B, elements A and C, elements B and C, and elements A, B, and C. Further, one having skill in the art will understand the degree to which terms such as "about" or "substantially" convey in light of the measurement techniques utilized herein. To the extent such terms may not be clearly defined or understood by one having skill in the art, the term "about" shall mean plus or minus ten percent.

Although specific embodiments are described herein, the scope of the technology is not limited to those specific embodiments. Moreover, while different examples and embodiments may be described separately, such embodiments and examples may be combined with one another in implementing the technology described herein. One skilled in the art will recognize other embodiments or improvements that are within the scope and spirit of the present technology. Therefore, the specific structure, acts, or media are disclosed only as illustrative embodiments. The scope of the technology is defined by the following claims and any equivalents therein.

What is claimed is:

1. A method of characterizing a sample through opto-acoustic metrology by switching functionality associated with a pump beam and a probe beam, the method comprising:
    generating a first acoustic wave by directing a first pump pulse to a surface of a sample;
    generating a second acoustic wave by directing a first probe pulse to the surface of the sample after a first duration of time from the first pump pulse, wherein the first probe pulse reflects off the sample and is altered by the first acoustic wave;
    after a second duration of time after the first probe pulse reflects off the surface of the sample, directing a second pump pulse to the surface of the sample, wherein the second pump pulse reflects off the sample and is altered by the second acoustic wave; and
    using the reflected first probe pulse to determine a first characteristic of the sample and the reflected second pump pulse to determine a second characteristic of the sample.

2. The method of claim 1, wherein the first duration of time is less than the second duration of time.

3. The method of claim 1, wherein the first characteristic of the sample is at a first depth and, the second characteristic is at a second depth, and the second depth is greater than the first depth.

4. The method of claim 1, further comprising altering a delay between a pulse in the pump beam and a pulse in the probe beam based on an adjustment to a delay stage.

5. The method of claim 1, wherein the second pump pulse has a first polarization and the first probe pulse has a second polarization.

6. The method of claim 1, further comprising directing a third pump pulse and second probe pulse to a location on the sample that is different from a location where the first pump pulse and the first probe pulse are directed.

7. The method of claim 6, wherein:
    the third pump pulse is a secondary pump pulse split from the first pump pulse; and
    the second probe pulse is a secondary probe pulse split from the first probe pulse.

8. A method of characterizing a sample through opto-acoustic metrology by switching functionality associated with a pump beam and a probe beam, the method comprising:
    directing a first pump pulse towards a surface of the sample, wherein the first pump pulse generates a first acoustic wave in a bulk of the sample;
    directing a first probe pulse towards the surface of the sample, wherein the first probe pulse is altered by the first acoustic wave when the first probe pulse reflects from the surface of the sample to create a reflected first probe pulse, and wherein the first probe pulse generates a second acoustic wave in the bulk of the sample;
    directing a second pump pulse towards the surface of the sample, wherein the second pump pulse is altered by the second acoustic wave when the second pump pulse reflects from the surface of the sample to create a reflected second pump pulse;
    based on the reflected first probe pulse, determining a first characteristic of the sample at a first depth; and
    based on the reflected second pump pulse, determining a second characteristic of the sample at a second depth.

9. The method of claim 8, wherein the first pump pulse and the second pump pulse are split from a pump beam.

10. The method of claim 8, wherein a duration of time between the first pump pulse reaching the surface and the first probe pulse reaching the surface is less than a duration of time between first probe pulse reaching the surface and the second pump pulse reaching the surface.

11. The method of claim 10, wherein the first depth is less than the second depth.

12. The method of claim 8, wherein the first probe pulse passes through a variable delay stage and the method further comprises:
    increasing a length of the variable delay stage;
    subsequent to increasing the length of the variable delay stage, directing a third pump pulse to the surface, wherein the third pump pulse generates a third acoustic wave in the sample;
    directing a second probe pulse through the variable delay stage and towards the surface of the sample, wherein:
        the second probe pulse is altered by the third acoustic wave when the second probe pulse reflects from the surface of the sample to create a reflected second probe pulse;
        the second probe pulse generates a fourth acoustic wave in the bulk of the sample;
    detecting the reflected second probe pulse; and
    based on the detected reflected second probe pulse, determining a third characteristic of the sample at a third depth.

13. The method of claim 12, further comprising:
    directing a fourth pump pulse towards the surface of the sample, wherein the fourth pump pulse is altered by the fourth acoustic wave when the fourth pump pulse reflects from the surface of the sample to create a reflected fourth pump pulse; and
    based on the reflected fourth pump pulse, determining a fourth characteristic of the sample at a fourth depth.

14. The method of claim 8, wherein the first probe pulse has a first polarization and the second pump pulse has a second polarization.

15. A system for characterizing a sample through opto-acoustic metrology by switching functionality associated with a pump beam and a probe beam, the system comprising:
    means for generating a first acoustic wave by directing a first pump pulse to a surface of the sample,
    means for generating a second acoustic wave by directing a first probe pulse to the surface of the sample after a first duration of time from the first pump pulse, wherein the first probe pulse reflects off the sample and is altered by the first acoustic wave;

means for directing a second pump pulse to the surface of the sample after a second duration of time after the first probe pulse reflects off the surface of the sample, wherein the second pump pulse reflects off the sample and is altered by the second acoustic wave; and means for using the reflected first probe pulse to determine a first characteristic of the sample and the reflected second pump pulse to determine a second characteristic of the sample.

16. The system of claim 15, wherein the first duration of time is less than the second duration of time.

17. The system of claim 15, wherein the second pump pulse has a first polarization and the first probe pulse has a second polarization.

18. The system of claim 15, wherein the first characteristic corresponds to a first depth and the second characteristic corresponds to a second depth, the first depth being less than the second depth.

* * * * *